US012267439B2

(12) United States Patent
Zyskind et al.

(10) Patent No.: US 12,267,439 B2
(45) Date of Patent: Apr. 1, 2025

(54) SYSTEM AND METHOD OF CREATING CHAIN-ASSISTED DIGITAL SIGNATURE

(71) Applicant: Gamma Research and Development Ltd., Tel Aviv (IL)

(72) Inventors: Guy Zyskind, Tel-Aviv (IL); Avishay Yanai, Tel-Aviv (IL); Yitzhak Grossman, Tel-Aviv (IL); Assaf Morami, Tel-Aviv (IL)

(73) Assignee: Gamma Research and Development Ltd., Tel-Aviv (IL)

( * ) Notice: Subject to any disclaimer, the term of this patent is extended or adjusted under 35 U.S.C. 154(b) by 0 days.

(21) Appl. No.: 18/665,656

(22) Filed: May 16, 2024

(65) Prior Publication Data

US 2024/0388442 A1     Nov. 21, 2024

Related U.S. Application Data

(60) Provisional application No. 63/467,424, filed on May 18, 2023.

(51) Int. Cl.
*H04L 29/06* (2006.01)
*H04L 9/00* (2022.01)
*H04L 9/08* (2006.01)
*H04L 9/32* (2006.01)

(52) U.S. Cl.
CPC ............ *H04L 9/3247* (2013.01); *H04L 9/085* (2013.01); *H04L 9/50* (2022.05)

(58) Field of Classification Search
CPC .......... H04L 9/3247; H04L 9/085; H04L 9/50
See application file for complete search history.

(56) References Cited

U.S. PATENT DOCUMENTS

| 10,282,711 | B2* | 5/2019 | Chan ................. G06Q 10/103 |
| 11,921,706 | B2* | 3/2024 | Bartolucci ........... H04L 9/3255 |
| 2017/0317997 | A1* | 11/2017 | Smith ..................... H04L 9/14 |
| 2019/0058595 | A1* | 2/2019 | Hamasni ............... G06Q 20/02 |
| 2021/0216306 | A1* | 7/2021 | Moeller ................. G06F 8/656 |
| 2022/0337414 | A1* | 10/2022 | Hung ...................... H04L 9/50 |

OTHER PUBLICATIONS

Cai, Ting, et al. "A blockchain-assisted trust access authentication system for solid." IEEE access 8 (2020): 71605-71616. (Year: 2020).*

* cited by examiner

*Primary Examiner* — Ka Shan Choy
(74) *Attorney, Agent, or Firm* — PEARL COHEN ZEDEK LATZER BARATZ LLP

(57) ABSTRACT

A system and method for performing secure exchanges of data over a computer network may include: generating, by a computerized blockchain entity, data points of the blockchain entity based on a data point from a first computerized signing entity; reconstructing, by the blockchain entity, data points of a plurality of signing entities, where data points of the signing entities are generated based on one or more of the data points of the blockchain entity; and performing an exchange of data between one or more of the entities based on the reconstructed data points. In some embodiments, the blockchain entity may comprise two components: a public component (which may be accessible to signing entities) and a private component (which may not be accessible to the signing entities). Some embodiments may include implementing the blockchain entity on a blockchain network, and/or simulating computerized operations by some of the relevant entities.

20 Claims, 18 Drawing Sheets

| Protocol | Parties | Writes | Messages | Primitives | Properties |
|---|---|---|---|---|---|
| CGGMP | n | 4 | $O(n^2)$ | Paillier Encryption | Identifiable Abort |
| DKLS19 | n | $\log(t) + 6$ | $O(n^2)$ | OT | |
| BMP Guy: | n | | | | |
| CCLST20 | n | 8 | $O(n^2)$ | Class-groups HE | |
| Lindell18 | n | 8 | $O(n^2)$ | Paillier Encryption | |
| Lindell17 | 2 | 2 | | Paillier Encryption | |
| Xue21 | 2 | 3 | | PE, CL, or OT | |
| CCLST19 | 2 | 3 | | CL | |
| DKLS18 | 2 | 7 | | OT | |
| This work | n | 1-2 | $O(n)$ | Group ops and proofs | Fairness, Robustness |
| This work | 1 | 1 | | Paillier Encryption | |

FIG. 4

PROTOCOL 3. ( *Key-Generation*: KeyGen )

1. Users' dealing:
   a. Party $P_1$ samples a random $x_u \leftarrow \mathbb{Z}_q$.
   b. Party $P_1$ computes $[x_u] \leftarrow$ SS.Share($x_u$, $t$, $N$).
   c. Party $P_1$ sends $[x_u]_i$ to $P_i$ for all $i \in [1, n]$ and $[x_u]_i$ to $P_c$ for all $i \in [n+1, N]$.

502

2. Center's dealing:
   a. Party $P_c$ samples a random $x_c \leftarrow \mathbb{Z}_q$.
   b. Party $P_c$ computes $[x_c] \leftarrow$ SS.Share($x_c$, $t$, $N$), and sends $[x_c]_i$ to $P_i$ for $i \in [1, n]$.

504

3. Compute key share:
   a. For each $j \in n+1, ..., N$, $P_c$ computes $[x]_j = [x_u]_j + [x_c]_j \bmod q$ and $X_j \leftarrow [x]_j \cdot G$.
   b. Each party $P_i$ ($i \in [1, n]$) computes $[x]_i = [x_u]_i + [x_c]_i \bmod q$ and $X_i = [x]_i \cdot G$.
   c. Each party $P_i$ ($i \in [1, n]$) sends $X_i$ to $P_c$.

506

4. Public key:
   a. Let $P$ be the polynomial defined by the $t+1$ points $(n, [x]_n)$, $(n+1, [x]_{n+1})$, ..., $(N, [x]_N)$, and let $\lambda_n^j, \lambda_{n+1}^j, ..., \lambda_N^j$ be the Lagrange coefficients s.t. $P(j) = \sum_{k=n}^{N} \lambda_k^j \cdot [x]_k$.
   b. Party $P_c$ verifies that the keys are consistent: For every $j \in [1, n-1]$ compute $X'_j = P(j) \cdot G = \sum_{k=n}^{N} \lambda_k^j \cdot X_k$, then, abort if $X'_j \neq X_j$.
   c. Otherwise (if all key shares are consistent) $P_c$ broadcasts the public key $X = P(0) \cdot G = \sum_{k=n}^{N} \lambda_k^0 \cdot X_k$.

FIG. 5

PROTOCOL 4. ( *Signing*: Sign ($M$, ($\mathbb{G}$, $G$, $q$), $sid$) )

Inputs.

1. Each party $P_i$, $i \in [1, n]$, holds ($[x]_i$, $X$).
2. Party $P_c$ holds $X$ and $[x]_i$ for all $i \in [n + 1, N]$.
3. The parties Compute $m = H_q(M)$ and verify that sid has not been used before (otherwise the protocol is not executed).

The protocol.

1. Users' dealing:

a. Party $P_1$ samples a random $k_u$, $a_u \leftarrow \mathbb{Z}_q$.
    b. Party $P_1$ computes $[k_u] \leftarrow$ SS.Share($k_u$, $t$, $N$) and $[a_u] \leftarrow$ SS.Share($a_u$, $t$, $N$).
    c. Party $P_1$ computes $[z_u] \leftarrow$ SS.Share(0, $2t$, $N$) and $[z'_u] \leftarrow$ SS.Share(0, $2t$, $N$).
    d. Party $P_1$ sends ($[k_u]_i$, $[a_u]_i$, $[z_u]_i$, $[z'_u]_i$) to party $P_i$ where $i \in [1, n]$ and to $P_c$ where $i \in [n + 1, N]$.
    e. Party $P_1$ sends $R_u = k_u \cdot G$ to $P_c$.

*(602)*

2. Center's dealing:

a. Party $P_c$ computes $k_c = H(x_c \| sid)$.
    b. Party $P_c$ samples a random $a_c \leftarrow \mathbb{Z}_q$.
    c. Party $P_c$ computes $[k_c] \leftarrow$ SS.Share ($k_c$, $t$, $N$) and $[a_c] \leftarrow$ SS.Share ($a_c$, $t$, $N$).
    d. Party $P_c$ computes $[z_c] \leftarrow$ SS.Share (0, $2t$, $N$) and $[z'_c] \leftarrow$ SS.Share(0, $2t$, $N$).
    e. $P_c$ sends ($[k_c]_i$, $[a_c]_i$, $[z_c]_i$, $[z'_c]_i$) to party $P_i$ for $i \in [1, n]$.
    f. $P_c$ sends $R = k_c \cdot G + R_u$ to everyone.

3. Partial signature.

a. Every party $P_i$ for $i \in [1, n]$, and $P_c$ for $i \in [n + 1, N]$:

i. Computes $[\alpha]_i = [\alpha_u]_i + [\alpha_c]_i \bmod q$, for $\alpha \in \{k, a, z, z'\}$.

ii. Computes $[s_1]_i = [a]_i (m + r[x]_i) - [z]_i \bmod q$ and $[s_2]_i = [k]_i [a]_i - [z']_i \bmod q$.

606 b. $P_i$ for $i \in [1, n]$ sends $(m, [s_1]_i, [s_2]_i)$ to $P_c$.

4. Finalization. Upon receiving $t + 1$ messages, $\{(m, [s_1]_{ij}, [s_2]_{ij})\}_{j=1}^{t+1}$, party $P_c$:

a. Computes $s_1 = $ SS.Reconstruct($\{[s_1]_{ij}\}_{j=1}^{t+1}, \{[s_1]_j\}_{j=n+1}^{N}$) and $s_2 = $ SS.Reconstruct($\{[s_2]_{ij}\}_{j=1}^{t+1}, \{[s_2]_j\}_{j=n+1}^{N}$).

b. Computes $s = s_1 \cdot s_2^{-1} \bmod q$.

c. Broadcasts $(r, s)$ if it is a valid signature on MSG, otherwise it broadcasts $\bot$.

FIG. 6B

PROTOCOL 5. (*Robust Key-Generation:* KeyGen)

1. User's dealing: Every $P_k$, ($k \in \{1, ..., t+1\}$):

a. Samples $x_k \leftarrow \mathbb{Z}_q$ and computes and broadcasts $(\{c_j^k\}_{j=1}^{N}, \{A_j^k\}_{j=0}^{t}, \pi^k) \leftarrow \text{PVSS.Share}_{t,N}(x_k)$.

702 — b. Let $u \in [1, t+1]$ be the first index for which $1 = \text{PVSS.CheckDealer}(\{c_j^u\}_{j=1}^{N}, \{A_j^u\}_{j=0}^{t}, \pi^u)$.

Denote these values by $\{c_j\}_{j=1}^{N}, \{A_j\}_{j=0}^{t}$ (i.e., dropping the supertext $u$)

2. Center's dealing:

a. $P_c$ Samples a random $x_c \leftarrow \mathbb{Z}_q$, computes $(\{c_j'\}_{j=1}^{N}, \{A_j'\}_{j=0}^{t}, \pi') \leftarrow \text{PVSS.Share}_{t,N}(x_c)$.

b. $P_c$ sends $[x_c]_i$ to $P_i$ for $i \in [1, n]$ and broadcasts

704 — $\{A_j'\}_{j=0}^{t}$ (the proof is unnecessary).

3. Compute key shares:

a. Each party $P_i$ computes ($P_c$ computes for $i \in [n+1, N]$):

i. $[x]_i = [x_u]_i + [x_c]_i \mod q$ where $[x_u]_i = \text{EG.Dec}_{dki}(c_j)$, ii. $X_j = A_j + A_j'$ for all $j \in [1, n]$, and iii. The public ECDSA key $X = \sum_{k=0}^{t} j^k \cdot (A_k + A_k')$.

FIG. 7A

PROTOCOL 6. ( *Robust Signing*: Sign ($M$, ($\mathbb{G}$, $G$, $q$), sid ) )

Inputs.
1. Each party $P_i$, $i \in [1, n]$, holds ($[x]_i$, $X$).
2. Party $P_c$ holds $X$ and $[x]_i$ for all $i \in [n+1, N]$.
3. The parties Compute $m = H_q(M)$ and verify that sid has not been used before (otherwise the protocol is not executed).

The protocol.
1. Users' dealing: Every $P_l$, ($l \in \{1, ..., t+1\}$):

a. Samples $k_l, a_l \leftarrow \mathbb{Z}_q$ and computes and broadcasts $(\{c_{k,i}^l\}_{i=1}^N, \{K_j^l\}_{j=0}^t, \pi_k^l) \leftarrow$ PVSS.Share$_{t,N}(K_l)$, $(\{c_{a,i}^l\}_{i=1}^N, \{A_j^l\}_{j=0}^t, \pi_a^l) \leftarrow$ PVSS.Share$_{t,N}(a_l)$, $(\{c_{z,i}^l\}_{i=1}^N, \{Z_j^l\}_{j=0}^t, \pi_z^l) \leftarrow$ PVSS.Share$_{2t,N}(0)$, $(\{c_{z',i}^l\}_{i=1}^N, \{Z_j'^l\}_{j=0}^t, \pi_{z'}^l) \leftarrow$ PVSS.Share$_{2t,N}(0)$.

712 b. Let $u \in [1, t+1]$ be the first index for which $1 = $ PVSS.CheckDealer( $\{c_{\alpha,i}^u\}_{i=1}^N, \{\alpha_j^u\}_{j=0}^t, \pi_\alpha^u$)

for all $\alpha \in \{k, a, z, z'\}$.

2. Center's dealing:

a. Party $P_c$ computes $k_c = H(x_c || \text{sid})$, samples $a_c \leftarrow \mathbb{Z}_q$.
    and computes $(\{c_{k,i}^c\}_{i=1}^N, \{K_j^c\}_{j=0}^t, \cdot) \leftarrow$ PVSS.Share$_{t,N}(k_c)$, $(\{c_{a,i}^c\}_{i=1}^N, \{A_j^c\}_{j=0}^t, \cdot) \leftarrow$ PVSS.Share$_{t,N}(a_c)$, $(\{c_{z,i}^c\}_{i=1}^N, \{Z_j^c\}_{j=0}^t, \cdot)) \leftarrow$ PVSS.Share$_{2t,N}(0)$, $(\{c_{z',i}^c\}_{i=1}^N, \{Z_j'^c\}_{j=0}^t, \cdot)) \leftarrow$ PVSS.Share$_{2t,N}(0)$.

b. $P_c$ sends ($[k_c]_i, [a_c]_i, [z_c]_i, [z'_c]_i$) to $P_i$ for $i \in [1, n]$
    and broadcasts $\{K_j^c, A_j^c, Z_j^c, Z_j'^c\}_{j=0}^t$.

3. Local computation.

a. $P_i$ ($i \in [1, N]$) computes $[\alpha]_i = [\alpha_u]_i + [\alpha_c]_i \mod q$ for $\alpha \in \{k, a, z, z'\}$, where $[\alpha_u]_i = \text{EG.Dec}_{dki}(c_{\alpha,i}^u)$.

b. $P_i$ ($i \in [1, N]$) computes $[s_1]_i = [a]_i (m + r[x]_i) - [z]_i \mod q$ and $[s_2]_i = [k]_i [a]_i - [z']_i \mod q$.

c. $P_i$ ($i \in [1, n]$) computes $M_{i,1} = ([a]_i \cdot [x]_i) \cdot G$ and $M_{i,2} = ([a]_i \cdot [k]_i) \cdot G$.

d. Everyone computes $K_i = K_i^u + K_i^c$, $A_i = A_i^u + A_i^c$, $Z_i = Z_i^u + Z_i^c$ and $Z'_i = Z'^u_i + Z'^c_i$ for all $i \in [1, n]$ as well as $r = K.x \mod q$ where $K = K_0^u + K_0^c$.

708

4. Partial signature.

a. $P_i$ ($i \in [1, n]$) sends (prove, $\text{sid}\|1, A_i, X_i, M_{i,1}, a_i, x_i$) and (prove, $\text{sid}\|2, A_i, K_i, M_{i,2}, a_i, k_i$) to $F_{zk}^{R_{DHT}}$.

710 b. $P_i$ ($i \in [1, n]$) sends ($m, [s_1]_i, [s_2]_i, M_1, M_2$) to $P_c$.

5. Finalization. Upon receiving at least $t + 1$ messages ($m, [s_1]_i, [s_2]_i, M_{i,1}, M_{i,2}$) for which $[s_1]_i \cdot G = r \cdot M_{i,1} + m \cdot A_i - Z_i$, $[s_2]_i \cdot G = M_{i,2} - Z'_i$, and proofs (proof, $\text{sid}\|1, A_i, X_i, M_{i,1}$) and (proof, $\text{sid}\|2, A_i, K_i, M_{i,2}$) were received from $F_{zk}^{R_{DHT}}$, denote these indices by I. Then party $P_c$:

a. Computes $s_1 = \text{SS.Reconstruct}(\{[s_1]_i\}_{i \in I}, \{[s_1]_j\}_{j=n+1}^N)$ and $s_2 = \text{SS.Reconstruct}(\{[s_2]_i\}_{i \in I}, \{[s_2]_j\}_{j=n+1}^N)$.

b. Broadcasts $s = s_1 \cdot s_2^{-1} \mod q$.

FIG. 7C

PROTOCOL 7. ( *Two-Party Key-Generation:* KeyGen )

1. $P_C$'s randomness setup.
   a. $P_C$ picks a random value $v \leftarrow \{0,1\}^k$ and computes $v_x = H(v)$.
   b. $P_C$ sends $v_x$ to $P_U$.

2. Party $P_U$'s message:
   a. $P_U$ samples a random $x_U \leftarrow \mathbb{Z}_q^*$ and computes $X_U = x_U \cdot G$.
   b. $P_U$ generates a Paillier key-pair $(pk, sk)$ where $pk = N = P \cdot Q$ with $k'$-bit primes $P, Q$, and computes $c_{key} = \text{Enc}_{pk}(x_U)$. ($k'$ is the bit-length of the factors of N for the Paillier encryption scheme to be secure).
   c. $P_U$ sends $X_U$, $pk = N$ and $c_{key}$ to $P_C$.
   d. $P_U$ proves in zero-knowledge that $N \in L_p$ and that it knows a witness $(x_U, P, Q)$ such that $(c_{key}, N, X_U) \in L_{PDL}$, by sending (prove, $c_{key}$, $N$, $X_U$, $x_U$, $P$, $Q$) to $F_{zk}^{keygen}$.

3. Party $P_C$'s message: Upon receiving (proof, $c_{key}$, $N$, $X_U$) from $F_{zk}^{keygen}$:
   a. Verify that $c_{key} \in \mathbb{Z}_{N^2}^*$ and that N is of length at least $2k'$.
   b. $P_C$ computes $x_C = H(v \| \text{keygen})$, and $X_C = x_C \cdot G$ and $X = x_C \cdot X_U$.
   c. Send X to $P_U$.

4. Output:
   a. $P_U$ outputs $(pk, sk, x_U, X)$.
   b. $P_C$ outputs $(pk, x_C, X)$.

FIG. 8A

PROTOCOL 8. ( *2P Signing:* Sign ($M$, ($\mathbb{G}$, $G$, $q$), *sid*) )

Inputs.

1. Party $P_u$ holds ($pk$, $sk$, $x_u$, $X$).
2. Party $P_c$ holds ($pk$, $x_c$, $X$).
3. The parties Compute $m = H_q(M)$ and verify that sid has not been used before (otherwise the protocol is not executed).

The protocol.

1. Party $P_u$'s message:
   a. $P_u$ chooses $k_u \leftarrow \mathbb{Z}_q$ and computes $R_u = k_u \cdot G$.
   b. $P_u$ sends $R_u$ to $P_c$.
   c. $P_u$ sends (prove, sid, $R_u$, $k_u$) to $F_{zk}$ to proves knowledge of $k_u$.

2. $P_c$'s message: Upon receiving (proof, sid, $R_u$) from $F_{zk}$:
   a. $P_c$ computes $k_c = H(v \| sid)$ and computes $R = k_c \cdot R_u$ and $r = R.x \mod q$.
   b. $P_c$ chooses $\rho \leftarrow \mathbb{Z}_{q^2}$ and $\tilde{r} \leftarrow \mathbb{Z}_N^*$.
   c. $P_c$ computes:
      i. $c_1 = Enc_{pk}(\rho q + [(k_c)^{-1} m \mod q], \tilde{r})$,
      ii. $v = (k_c)^{-1} \cdot r \cdot x_c \mod q$,
      iii. $c_2 = c_1 \oplus (v \odot c_{key})$
   d. $P_c$ sends $R$ and $c_2$ to $P_u$.

3. Output:
   a. $P_u$ computes $s' = (k_u)^{-1} \cdot Dec(sk, c_2) \mod q$ and $r = R.x \mod q$.
   b. $P_u$ outputs ($r$, $s$) where $s = \min(s', q - s')$.

FIG. 8B (a) Table (a)

| Tx Type | Time (ms) | Tx size (bytes) | Gas Used | Tx Cost (¢) |
|---|---|---|---|---|
| init | 0.07 | 43 | 45,227 | 0.04¢ |
| Keygen | 7.93 | 1,206 | 132,792 | 0.11¢ |
| Presig | 11.65 | 4,335 | 237,195 | 0.19¢ |
| Sign_1 | 1.62 | 295 | 138,865 | 0.11¢ |
| Sign_2 | 1.55 | 295 | 140,599 | 0.11¢ |
| Sign_3 | 1.51 | 295 | 142,328 | 0.11¢ |
| Sign_4 | 1.85 | 295 | 144,046 | 0.12¢ |
| Sign_5 | 12.95 | 295 | 187,238 | 0.15¢ |

(b) Table (b)

| Tx Type | Time (ms) | Tx size (bytes) | Gas Used | Tx Cost (¢) |
|---|---|---|---|---|
| Keygen | 175.35 | 2,707 | 856,051 | 0.68¢ |
| Sign | 313.75 | 287 | 1,882,619 | 1.51¢ |

FIG. 10

| Tx Type | Gas Used |
|---|---|
| Token transfer | 55,877 |
| NFT Mint/Transfer | 150,833 |
| Token Swap (direct) | 595,916 |
| Token Swap (2-hops) | 1,553,937 |

FIG. 11

SYSTEM AND METHOD OF CREATING CHAIN-ASSISTED DIGITAL SIGNATURE

PRIOR APPLICATION DATA

The present application claims benefit from prior U.S. Provisional Application 63/467,424, filed on May 18, 2023, and entitled "SYSTEM AND METHOD OF CHAIN-ASSISTED THRESHOLD ECDSA AND ITS APPLICATIONS", incorporated by reference herein in its entirety.

FIELD OF THE INVENTION

The present invention relates to cryptographic wallets. More specifically, the present invention relates to chain-assisted digital signatures.

BACKGROUND OF THE INVENTION

In recent years, there has been growing interest in cryptographic techniques that enable multiple parties to jointly sign a message using a shared secret key. Such techniques have gained increasing importance in the custody of cryptocurrencies and Web3 due to its ability to improve security and control over private key management. By enabling multiple parties to jointly control a single private key, multi-party signing techniques allow for the creation of multi-signature (multisig) accounts that require multiple approvals before a transaction can be signed. This may enhance security by reducing the risk of information being stolen or lost due to a single point of failure. Additionally, some multisig techniques may enable the creation of flexible and customizable access policies.

In recent years, designers of cryptographic protocols have been increasingly relying on blockchains as their broadcast channel infrastructure. In both theory and practice, blockchains can assist in achieving desired protocol properties, including overcoming known impossibility results. Such a transition has prompted researchers to explore other benefits that can be derived from blockchains.

Some solutions including efficient multisig protocols may entail a formidable computational cost (e.g., due to using Paillier's Homomorphic Encryption (HE) or expensive zero-knowledge proofs over Paillier ciphertexts). There is thus a need for multisig protocols that may be both computationally economical and efficient, and offer additional features, such as for example, enhanced security and resilience towards undesirable factors such as for example network failures or unavailability which may slow down the protocol or make its use undesirable.

SUMMARY

Some embodiments of the invention may allow for performing secure exchanges of data over a computer network (e.g., using a blockchain party) and may include, for example: generating, by a computerized blockchain entity, data points of the blockchain entity based on a data point from a first computerized signing entity; reconstructing, by the blockchain entity, data points of a plurality of signing entities, where data points of the signing entities are generated based on one or more of the data points of the blockchain entity; and performing an exchange of data between one or more of the entities based on the reconstructed data points.

In some embodiments, the blockchain entity may include two components: a public component (which may be accessible to signing entities) and a private component (which may not be accessible to the signing entities).

In some embodiments, the blockchain entity may broadcast one or more of the reconstructed data points, the broadcasting using a public component of the blockchain entity.

In some embodiments, the blockchain entity may receive the data point from the first computerized signing entity using a private component of the blockchain entity, and the generating of data points of the blockchain entity may be performed using the private component.

Some embodiments may include implementing the blockchain entity on a blockchain network, and/or simulating computerized operations by some of the relevant entities.

Some embodiments may include or involve computerized key generation and/or signature protocols which may include or involve elliptic curve operations and techniques.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features, and advantages thereof, can be understood by reference to the following detailed description when read with the accompanied drawings. Embodiments are illustrated without limitation in the figures, in which like reference numerals may indicate corresponding, analogous, or similar elements, and in which:

FIG. 4 shows an example comparison of protocols according to some embodiments of the invention with some previous systems and methods;

FIG. 5 shows an example key generation protocol according to some embodiments of the invention;

FIG. 6A-B shows an example signing protocol according to some embodiments of the invention;

FIG. 7A-C shows an example of publicly verifiable secret sharing based key generation and signing protocols according to some embodiments of the invention;

FIG. 8A-B shows example two party key generation and signing protocols according to some embodiments of the invention;

FIG. 10 shows example benchmarks for multiparty ECDSA and two-party ECDSA according to some embodiments of the invention;

FIG. 11 shows example baselines cost estimates for gas according to some embodiments of the invention;

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention.

Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more".

The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof may occur or be performed simultaneously, at the same point in time, or concurrently.

Figure 1:
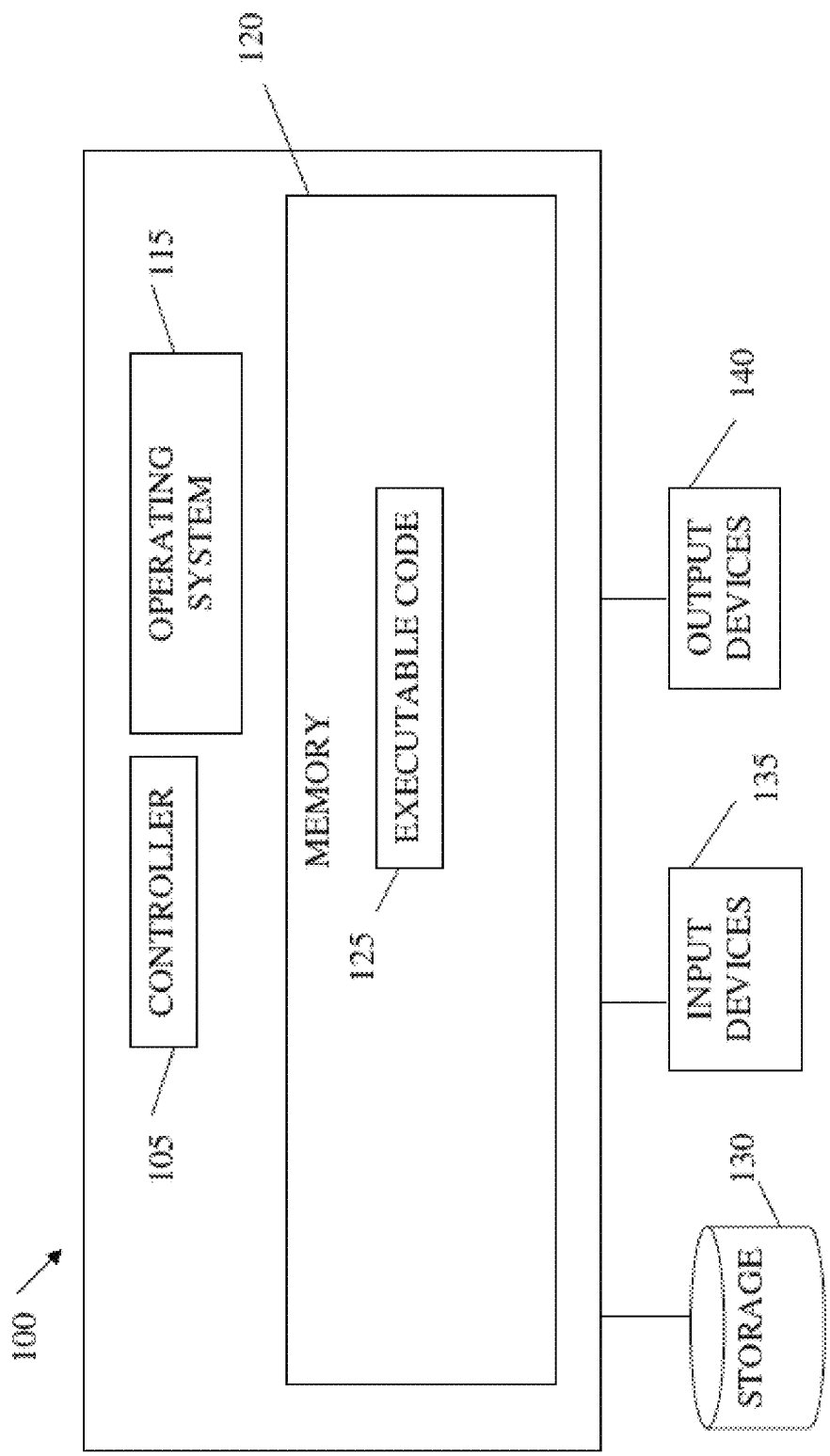
FIG. 1 is a high-level block diagram of an exemplary computing device which may be used with embodiments of the present invention.

FIG. 1 shows a high-level block diagram of an exemplary computing device which may be used with embodiments of the present invention. Computing device 100 may include a controller or computer processor 105 that may be, for example, a central processing unit processor (CPU), a chip or any suitable computing device, an operating system 115, a memory 120, a storage 130, input devices 135 and output devices 140 such as a computer display or monitor displaying for example a computer desktop system.

Operating system 115 may be or may include code to perform tasks involving coordination, scheduling, arbitration, or managing operation of computing device 100, for example, scheduling execution of programs. Memory 120 may be or may include, for example, a Random Access Memory (RAM), a read only memory (ROM), a Flash memory, a volatile or non-volatile memory, or other suitable memory units or storage units. Memory 120 may be or may include a plurality of different memory units. Memory 120 may store for example, instructions (e.g. code 125) to carry out a method as disclosed herein, and/or output data, etc.

Executable code 125 may be any application, program, process, task, or script. Executable code 125 may be executed by controller 105 possibly under control of operating system 115. For example, executable code 125 may be or execute one or more applications performing methods as disclosed herein. In some embodiments, more than one computing device 100 or components of device 100 may be used. One or more processor(s) 105 may be configured to carry out embodiments of the present invention by for example executing software or code. Storage 130 may be or may include, for example, a hard disk drive, a floppy disk drive, a compact disk (CD) drive, a universal serial bus (USB) device or other suitable removable and/or fixed storage unit. Data described herein may be stored in a storage 130 and may be loaded from storage 130 into a memory 120 where it may be processed by controller 105.

Input devices 135 may be or may include a mouse, a keyboard, a touch screen or pad or any suitable input device or combination of devices. Output devices 140 may include one or more displays, speakers and/or any other suitable output devices or combination of output devices. Any applicable input/output (I/O) devices may be connected to computing device 100, for example, a wired or wireless network interface card (NIC), a modem, printer, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory encoding, including, or storing instructions, e.g., computer-executable instructions, which, when executed by a processor or controller, carry out methods and procedures disclosed herein.

Users or parties as used herein (and as mentioned and/or included in various operations and/or method steps described herein) may be or may include computer systems such as for example system 100 and/or may be a computerized entity which may for example be constructed and/or implemented "on chain" (see further description herein) and perform exchanges of computerized data such as for example described herein.

Figure 2:
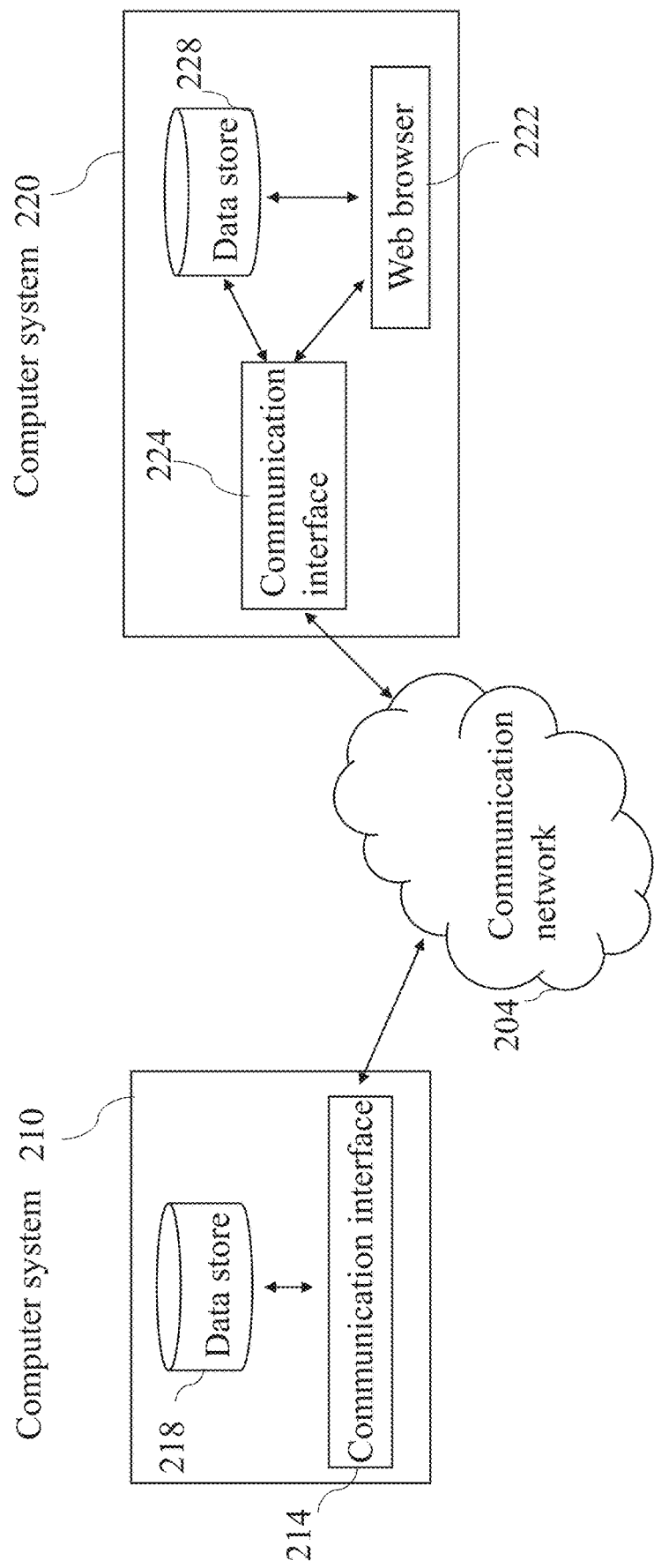
FIG. 2 shows example computer systems remotely connected by a data network according to some embodiments of the invention.

FIG. 2 shows example computer systems remotely connected by a data network according to some embodiments of the invention.

Some embodiments of the invention may include performing an exchange of data between remotely connected computer devices (for example based on reconstructed data points or signatures such as, e.g., described herein). For example, remote computer 210 (which may be or may be associated with, e.g., a party or entity among the plurality of parties or entities described herein) may send or transmit, over communication or data network 204, computerized data items or data points of information (which may be, for example shares and/or keys and/or signatures and/or a computerized requests or commands and/or blockchain data, and the like)—to computerized system 220 (which may similarly be or may be associated with, e.g., one or more parties such as for example among the parties described herein), and/or vice versa. Each of systems 210 and 220 may be or may include the various components described with reference to system 100, as well as other computer systems, and include and/or operate or perform, e.g., the various corresponding protocols and procedures described herein. In some embodiments, computerized systems 210 and 220 may additionally perform a plurality of operations including for example sending and/or transmitting and/or collecting and/or receiving additional data to or from additional remote computers systems. One skilled in the art may recognize that additional and/or alternative remote and/or computerized systems and/or network and connectivity types may be included in different embodiments of the invention.

Some embodiments may include performing of an exchange of data between one or more of: the blockchain entity, and one or more of the signing entities based on one or more of the reconstructed data points (e.g., according to the protocols and procedures further described herein).

In some embodiments of the invention, computer systems 210 and 220 may communicate via data or communication or data network 204 via appropriate communication interfaces 214 and 224, respectively—which may be for example NICs or network adapters as known in the art. Computerized systems 210 and/or 220 may include data stores such as, e.g., 218 and 228 which may for example include a plurality of received data items, messages, requests, reports, shares and/or keys and/or signatures and/or blockchain or blockchain related data, and the like, such as for example described herein. In some embodiments, computer systems 210 and 220 may implement or be part of a blockchain implementation—or of a distributed blockchain system or network—such as for example an Ethereum blockchain system, or a different blockchain system.

Communication "on chain" as used herein may be or may refer to exchanges of data between a plurality of nodes or parties (which may be for example computerized systems such as for example described herein) using a blockchain or blockchain network (may be referred to simply as "chain")—which may be or may include, e.g., a decentralized peer-to-peer network that utilizes blockchain technology to enable secure communication and data storage. In a blockchain system or network according to some embodiments, transactions and data may be grouped into blocks, which are cryptographically linked together to form a continuous chain. Through various consensus mechanisms, such as proof of work and/or proof of stake and/or some of the example protocols provided herein, agreement regarding the state of the blockchain ledger may be achieved across all network nodes or parties. This decentralized architecture may ensure immutability, transparency, and security, as transactions or exchanges of data may be immutable once confirmed, visible to all participants (also referred to herein as "entities" or "parties"), and secured using cryptographic techniques. Blockchain networks according to some embodiments may be permissionless, which may allow anyone to participate (e.g., using Bitcoin or Ethereum frameworks), or permissioned, restricting participation to authorized entities (e.g., using frameworks sometimes referred to as private blockchains).

For example, blockchain networks according to some embodiments of the invention may be implemented through various methods or combination of methods, including but not limited to, e.g., building/coding from scratch and/or forking existing blockchains and/or using blockchain development platforms and/or deploying private or consortium blockchains, and the like (see nonlimiting examples herein).

For web-based embodiments, using standards such as for example the RESTful APIs, JSON-RPC, or WebSocket protocols may facilitate interactions between blockchain networks and web-based applications. Additional or alternative implementations of blockchain networks allowing to perform operations "on chain" may be used in different embodiments.

A digital wallet or a smart wallet as used herein (also known as an e-wallet or electronic wallet), may be for example a computerized tool or technique that may allow users to securely store, manage, update, or transact with various types of digital assets, including, for example, cryptocurrencies, fiat currencies, loyalty points, and other digital tokens. Digital wallets may offer a convenient and efficient way to store, access and manage digital data and/or assets. In some embodiments, digital wallets may be or may include a blockchain unit or plurality of blockchain units, and/or cryptocurrencies and/or smart contracts, which may for example be maintained or stored by a plurality of computerized systems, for example according to the example methods and procedures described herein.

It should be noted that some digital wallets according to some embodiments may be used in contexts unrelated to finance and/or monetary transactions. Some embodiments of the invention may be used for performing computerized exchanges of data (which may also be referred to as "transactions" and may be for example be performed over a communication or data network) in various contexts, such for example ones relating to authentication, access privileges, access control, and secure document sharing. For instance, some embodiments may be used for securely storing, managing, and/or updating sensitive or confidential data and/or information-such as, e.g., securely storing and managing healthcare data and personal medical records; travel-related documents and identification credentials (such as for example passports, driver's licenses, boarding passes, and travel insurance policies); educational credentials (such as for example certificates, diplomas, and transcripts); and the like.

An elliptic curve algorithm according to some embodiments of the invention may include or involve performing computerized operations (including, e.g., addition and multiplication) on points on an elliptic curve (which may produce another point on the curve). Key generation, encryption, and digital signature algorithms according to some embodiments may include or may be based on such operations. For example, public and private keys may be generated by selecting a base point on the curve and performing scalar multiplication (and/or, for example, additional or alternative arithmetic or logical operations) with a randomly chosen private key to derive the public key. The private key may be kept secret, while the public key may be shared with a plurality of parties, for example for encryption or verification purposes. Elliptic curve algorithms according to some embodiments may be used to generate and verify digital signatures, which may be or may include cryptographic proofs of authenticity and integrity for digital messages or transactions. Signatures may be created, for example, by performing a corresponding elliptic curve digital signature algorithm (ECDSA), which may include computerized operations involving a private key and the message being signed, which may be verified using the corresponding public key. While some embodiments of the invention may include or involve elliptic curve protocols and procedures-additional or alternative protocols may be used in different embodiments of the invention.

Some example elliptic curve algorithms according to some embodiments are provided herein.

A threshold ECDSA wallet according to some embodiments may be or may refer to a type of digital cryptocurrency wallet employing threshold and/or elliptic curve based techniques—for example to manage private keys or shares. In a threshold ECDSA wallet according to some embodiments of the invention, a private key may be distributed among multiple parties or computerized devices—for example in a way that a subset of these parties may collectively generate a valid signature without revealing the full private key. In some embodiments of the invention a digital wallet may be or may include a blockchain or a plurality of blockchains, which may include or correspond to data included, stored, kept, or "guarded" by the wallet. As further discussed herein, a wallet according to some embodiments may include a dedicated blockchain party which may be implemented on chain, which may take part in key generation, signing, and the like, and which may include private and public components.

In wallets or digital wallets according to some embodiments, a wallet may generate a private-public key pair using an elliptic curve algorithm. Private keys may be divided into multiple shares, for example using a secret sharing scheme such as, e.g., Shamir's secret sharing. A threshold value may be defined, which may indicate the minimum number of shares required to reconstruct the full private key. For example, in a 3-of-5 threshold scheme, any combination of three out of the five shares (e.g., from 3 parties out of the 5 parties involved) may collectively generate a valid signature. When a transaction may be initiated and should be signed, the parties holding the required number of shares (as per the threshold) may collaborate to generate a signature. Each party may contribute their share of the private key without revealing it to others, and the combined shares may be used to produce the signature. The generated signature may be verified against the corresponding public key. If the signature is valid, the transaction may be determined as authentic and may be shared with or broadcasted to the network. Otherwise, the transaction may, e.g., be determined as inauthentic or fraudulent, and additional automated computerized actions (such as alert generation, or preventing the transaction) may be performed. Some nonlimiting embodiments improve fraud detection technology and may detect or prevent fraud—which may, e.g., be associated with malicious blockchain parties or entities. For example, some of the protocols and procedures described herein may include validating keys or signatures, and/or checking or verifying that data points such as, e.g., keys or signature shares are consistent (for example using an elliptic curve algorithm). As further described herein, and for example in case data points or shares are not consistent, embodiments may terminate, abort, or prevent the performing of an exchange of data (such as for example writing to the blockchain, adding a block, and the like) to prevent fraud, or to protect against suspicious and/or fraudulent activity.

A "data point" or "data point of information" such as for example shares or keys according to some embodiments may for example refer to computerized data objects in appropriate formats (which may be required to be consistent with relevant cryptographic requirements in different embodiments). Example shares or keys according to some embodiments may be generated and/or stored and/or transmitted as binary data, and/or using hexadecimal notation, Base64 encoding, JavaScript object notation (JSON) objects, abstract syntax notation one (ASN.1), as well as using custom, protocol specific data objects which may for example be defined using relevant blockchain development or application programming interface tools. Additional or alternative data structures or objects may be used in different embodiments.

It should be understood, for example, that a "data point of P1" may refer to a computerized data object (which may be or may represent, for example, a key or signature share, and which may be used according to some example procedures described herein) stored by computerized entity P1, which may not be available to separate entities, e.g., P2, . . . , Pn, which may not be exposed to data or information items stored, withheld, or kept "secret" or "private" in P1. Accordingly, "private" or "secret" as used herein may describe for example a data point or information accessible or known to a specific entity, such as for example P1 (which may store the relevant private item, e.g., in memory 120)—while not being accessible or known to separate entities P2, . . . , Pn (unless "disclosed", or provided, sent, or transmitted to them by P1). "Public" as used herein may refer to data points or information available for all relevant entities, such as for example information shared with all entities using a "bulletin board" or public component of the blockchain system, such as for example described herein.

According to some embodiments, wallets (which may also be referred to as "unstoppable wallets") may be provided to address the limitations of previous or existing blockchain based wallets. An unstoppable wallet may be, in some embodiments, a threshold ECDSA wallet where the counterparty co-signing transactions with the user (or a set of users) may not be a third-party (which may, e.g., not be itself involved in key generation and/or signing procedures as the other parties), but rather the computerized blockchain or blockchain network itself. This may enable the creation of programmable wallets that may be controlled directly by a smart contract—which may include predefined rules and conditions, simulated operations by entities, and the like, and which may generally automatically execute actions that may be programmed or implemented into digital wallets or blockchains according to some embodiments of the invention.

The term "unstoppable" as used herein may imply that digital wallets according to some embodiments may not be "stopped" or shut down by external entities parties—namely by ones not taking part in the blockchain system itself.

Unstoppable wallets according to some embodiments may operate cross-chain (and, for example, may not be limited to Ethereum or Ethereum virtual machine (EVM) chains described herein with regard to some nonlimiting examples). According to some embodiments, "cross-chain" operation may be or may refer to the ability of a wallet to interact with and manage multiple blockchain networks (e.g., of different types and/or standards) simultaneously. This may enable parties to send, receive, and manage different cryptocurrencies or digital assets that exist on separate blockchains, all within the same wallet computerized interface, program or platform.

Since some existing blockchain technologies may generally not allow the blockchain to keep a private state, the use of blockchains that support confidential smart contracts, such as for example an Ethereum blockchain—may be required in some embodiments.

Unstoppable wallet according to some embodiments of the invention may offer several improvements over existing technologies (such as for example traditional third-party based alternatives). As blockchains may always be available to relevant parties, unstoppable wallets according to some embodiments may not experience downtime—for example due to counterparties being unavailable. The use of smart contracts may according to some embodiments of the invention allow for greater flexibility and customization, enabling custom access policies (which may for example be implemented as code instructions or code execution within the blockchain system such as for example demonstrated herein), support for new chains and assets, and/or peer-to-peer wallets (as opposed to asset) exchange. Additionally, the use of blockchain techniques may imply a public "bulletin board", thereby allowing to achieve other desired properties such as fairness and robustness.

As used herein, fairness may refer to the property of a cryptographic protocol or system that ensures all parties involved in the protocol are treated fairly and no party gains an unfair advantage. Robustness may refer to the resilience and reliability of a cryptographic protocol or system in the face of various challenges, including attacks, errors, failures, and changes in the operating environment. For example, a robust cryptographic system may continue to function correctly and securely even when faced with adversarial behavior (e.g., by an "adversary", which may be a node, party, or entity in the network attempting to exploit vulnerabilities, manipulate transactions, or disrupt consensus mechanisms to undermine the integrity, security, or reliability of the blockchain network), implementation flaws, communication errors, or other unforeseen circumstances.

Some embodiments may include or provide example practical models for cryptographic protocols, and some example improvements over prior or existing systems and methods.

One might wish for a blockchain that entirely handles sensitive information, such as cryptographic keys (such as for example generated according to example protocols herein), and is able to confidentially perform operations (like sign and decrypt) using the keys. While confidential smart contracts-enabled blockchains aim to offer that, relying on them completely to safely store long-term keys may be considered too risky, as breaking the blockchain's privacy layer would automatically and irrevocably divulge all secret information to an attacker.

This calls for solutions that may rely on blockchains for confidential computing on secrets, but that may also consider the possibility of a breach and may take measures to recover. In the case of distributed signatures, it may be possible to rely on the blockchain to store a partial secret, which may only be a share of the actual underlying signing key. By doing so, breaking the blockchain security layer may only reveal that share of the secret included in the blockchain, and not the full key. Assuming attacks on the blockchain are temporary, resharing the signing key, or re-dividing the key into share, may revoke an adversary's gained information in case of a successful attack. Moreover, resharing may, for example, reset the adversary's state (e.g., of knowledge, of gained information, etc.) when breaking into the users' shares—e.g., as long as the adversary does not break into or gains access to a critical number of shares (such as, e.g., a number of 't+1' or more shares, as further discussed herein).

According to some embodiments, protocols for 'n' parties are provided, out of which, for example, at most 't<n' may be considered, simulated and/or configured to be "malicious" (which may refer to, e.g., attackers, malware, and parties relating to other threats that seek to exploit vulnerabilities in cryptographic systems) and "colluding" (which may refer to, e.g., parties collaborating or cooperating in an attempt to bypass security measures, break encryption, or compromise cryptographic keys, and the like)—to generate an ECDSA key-pair and sign messages, with the aid of blockchain techniques such as for example described herein.

According to some embodiments of the invention described herein, the blockchain itself may be considered, and/or modeled or simulated and/or configured to operate as an additional semi-honest (which may refer to, e.g., a party participating in a computation protocol that may follow the protocol specifications but may attempt to gather information about other parties' inputs or intermediate results) and non-colluding party, which may be referred to as 'Pc' herein. A system such as for example a blockchain system or network according to some embodiments of the invention may be a multi party or multi entity system including a plurality of parties or entities (which may be or may include or be implemented for example using computer systems remotely connected over a communication network, or computerized entities included or implemented "on chain", such as for example described herein) P1, P2, . . . . Pn, and a blockchain system or server as a separate party 'Pc'. It should be noted that additional or alternative frameworks for considering or modeling different parties and/or computer systems according to some embodiments of the invention may be realized.

In some embodiments of the invention, a party or entity such as, e.g., 'Pc' may be or may include a broadcast channel (which may allow sending, transmitting, or relaying a message to all other parties, and may for example be considered as a public component of 'Pc'), and may hold and operate on secrets (for example in a component of 'Pc' which may considered secret or private, and may include or store, e.g., secret shares such as for example described herein). Some embodiments may improve prior systems and methods, as in some embodiments, parties do not necessarily need to know each other in advance, or set up complex ad-hoc communication networks with point-to-point channels across each set of parties, or an underspecified broadcast channel, as done in some existing multi-party computation (MPC) protocols. In some embodiments, parties may come and go as they please, even mid-execution of a protocol, since all communication or coordination operations or protocols may be done on-chain—which may allow for robustness.

Performing all communication between parties on-chain (e.g., directly on a blockchain network) may be advantageous at a high level because it may simplify protocol implementation in practice, as each node or party may only read and write to a single endpoint, regardless of the number of counterparties. By relying on blockchain techniques, one does not need to take care of, e.g., network synchronization, and proofs of silence (which may be, e.g., a proof that a participant did not send a message) may be taken for granted. In some embodiments of the invention, however, this may not be interpreted as everything being perfect when using a blockchain; rather, that using a blockchain obscures these problems away from the developer. Indeed, a block lacking a message from a user does not necessarily mean the user did not send that message; for example, the recent blockchain block's validator/miner may have censored that message.

In some embodiments of the invention, key generation and signing operations may be implemented on-chain, for example using smart contracts and cryptographic functions within a blockchain network. For example, smart contracts according to some embodiments may generate cryptographic keys (public and/or private keys) on-chain using cryptographic algorithms including or involving elliptic curve cryptography (ECC). Users or parties may interact with the smart contract, for example by invoking a function to request key generation. The smart contract may generate new keys securely and may return some generated keys to the user while keeping other keys hidden and inaccessible. Public keys may be used for various purposes such as for example identity verification, encryption, or as an address for receiving encrypted messages, among others. Once a user has a private key generated either on-chain or off-chain, they may use it to sign transactions or messages on the blockchain (amounting, e.g., to exchanges of data over a computer network such as for example described herein). When a user signs a transaction, they may, for example, send the transaction data along with their private key to a designated smart contract function. The smart contract may verify the authenticity of the transaction, for example, by using a public key to validate the digital signature generated by the private key. If the signature is valid, the smart contract may execute the transaction (e.g., perform an exchange of data over a data network, and/or among entities within the blockchain network) and may update the blockchain's state accordingly; otherwise, the smart contract may not execute the transaction and/or update the blockchain state, and may for example abort a transaction or prevent a transaction from taking place.

In some embodiments, the blockchain entity is implemented on a blockchain network. In some embodiments of the invention, the blockchain network comprises an Ethereum blockchain.

For example, the blockchain entity (such as, e.g., further described herein) as well as key generation and signing "on-chain" according to some embodiments of the invention may for example be achieved using Ethereum smart contracts which may be self-executing contracts with some conditions and/or terms of the agreement directly written into code (which may be executed in a private component of a blockchain or blockchain network, such as for example according to some example processes herein). Example functionalities such as for example described herein may be implemented using Solidity, Ethereum's smart contract programming language. Additionally or alternatively, various cryptocurrency wallets such as for example the MetaMask, Trust Wallet, and Ledger Nano S cryptocurrency wallets may be used, for example, to generate private keys locally and interact with blockchain networks through application programming interfaces (APIs) or client software, and/or similarly provide on-chain functionalities such as for example key generation and signing capabilities using dedicated APIs. Some embodiments may utilize or be combined with and/or implemented in blockchain development frameworks such as for example Hyperledger Fabric and Corda. Some blockchain-based solutions according to some embodiments may include various functionalities such as, e.g., providing decentralized identity management capabilities, on-chain key generation and signing, user authentication, access control, and secure messaging—for example using some tools and/or frameworks such as for example the Sovrin decentralized identity network, and the Status.im or Whisper decentralized messaging platforms.

Additional or alternative tools, frameworks, and blockchain development related platforms for achieving on-chain functionalities, and/or for achieving or implementing additional or alternative features or operations such as for example described herein, may be used in different embodiments of the invention.

In some embodiments, it may be desirable to ensure that key generation and signing processes are implemented securely to prevent unauthorized access to private keys; some desirable cryptographic features such as fairness and robustness, as well as some cryptographic encryption techniques, may be achieved or provided by some protocols and procedures according to some embodiments of the invention.

Some embodiments of the invention may offer or provide additional or alternative benefits or improvements over prior technologies, such as pseudonimity, higher degree of censorship-resistance, public accountability (e.g., in the context of decentralized autonomous organization (DAO) multi-signatures), and the like. Finally, in some settings or systems (such as for example those in which a dishonest majority of parties may be assumed), implementation of a broadcast or public channel or component may not be possible. Thus, some embodiments of the invention based on a blockchain assisted model such as described herein may include or involve operating a broadcast channel e.g., the blockchain entity or 'Pc'.

In some embodiments of the invention, every message, e.g., peer-to-peer (P2P; for which may for example be or include sending a message between a first entity and a second entity among a plurality of computerized entities or parties) and/or broadcast (which may for example include sending a public message to more than one, or to all entities/parties involved, for example using a public component of a blockchain system), may be translated to or documented in a blockchain transaction, which may be considered as a broadcast message. While in some embodiments broadcasting on chain may entail larger latencies than a plain broadcast that is implemented among the parties, broadcasting on chain according to some embodiments may make all messages permanently public, which allows for publicly verifiable protocols that may offer various advantages such as for example encouraging the honesty of all parties.

In addition, in some embodiments, all broadcasts or public messages may be available to the participants whenever they are ready to consume or use them. This may enable easy recovery and auditability by parties who may experienced a temporary offline period.

Some embodiments may highlight the need for a reassessment of the concept of rounds and/or a number of rounds as a performance metric used to evaluate protocols, such as for example standard MPC based systems and methods (which do not include techniques, protocols and procedures such as for example described herein). "Rounds" may refer to the number of iterations or cycles performed by a cryptographic process or protocol. The number of rounds may refer to or may be used to informally measure or consider the length or complexity of a sequence of interdependent messages sent between parties in a given protocol. In some embodiments of the invention, each round may consist of one or more parties writing to the blockchain, followed by all parties reading from it. Although one might assume that some embodiments may involve decomposing each round into two separate sub-rounds (e.g., a writing part and a reading part), it may be recognized that writing to a blockchain may be significantly more computationally costly than reading from the blockchain, as the former may require consensus and updating a replicated state, as known in the art. Writing to a blockchain may also be more expensive than broadcasting a message to a set of P2P connected group of participants, as that group may implement a secure broadcast protocol that takes place 'locally', while writing to a blockchain according to some embodiments may be equivalent to broadcasting a message 'globally'. As a result, some embodiments may minimize the total number of operations and/or messages required in a single protocol (such as for example key generation and/or signing protocols such as for example described herein) compared to previous systems, with a specific focus on reducing the number of sequential writes, which may simply be referred to as 'writes' herein. It is noted that in some previous or existing protocols described herein, the number of writes is equivalent to the number of rounds, which may not apply to some protocols described herein with regard to some embodiments of the invention, which may highlight the importance of identifying a common performance metric different from, e.g., merely considering the number of rounds required for a given protocol.

Figure 3:
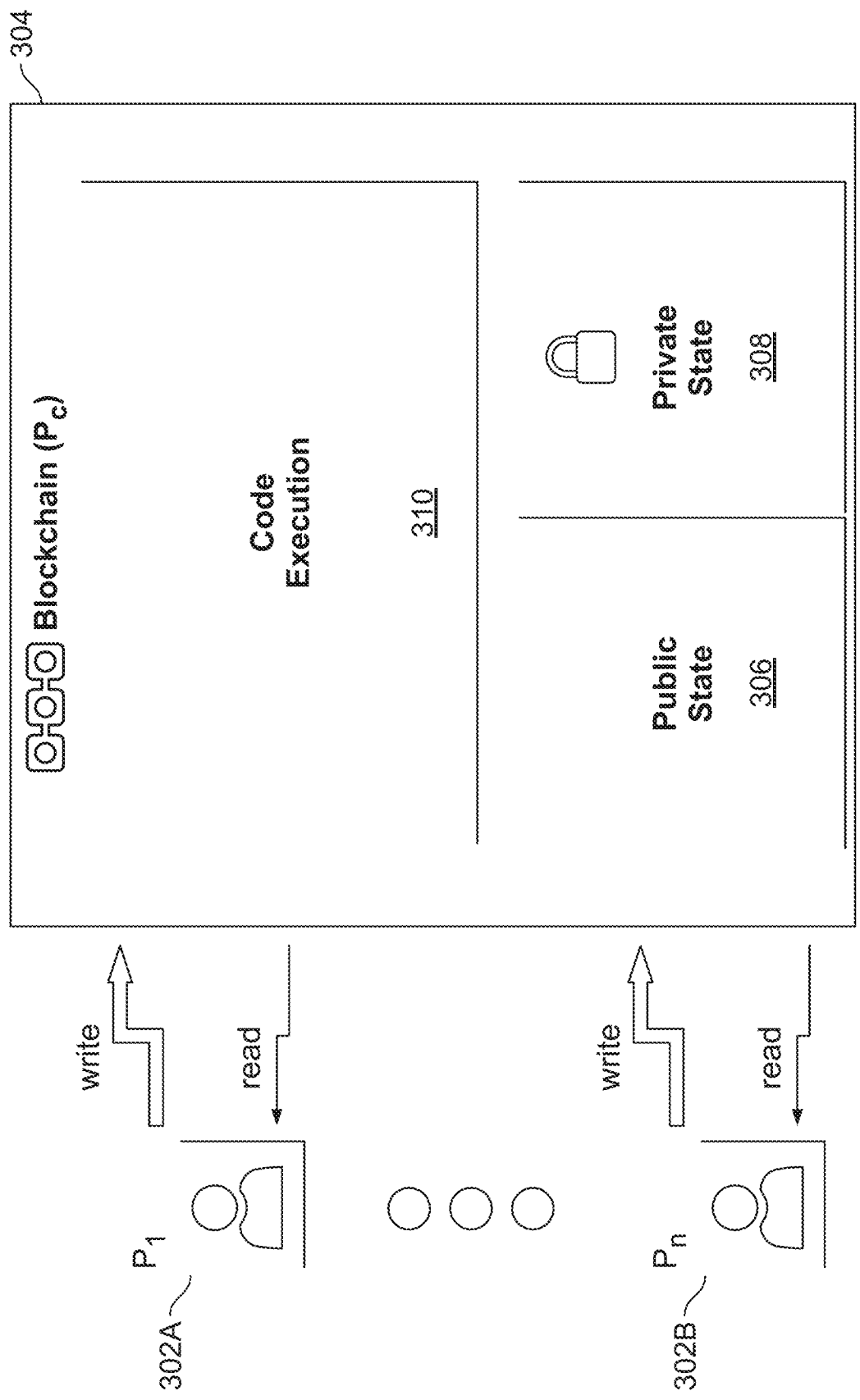
FIG. 3 is a block diagram of an example multi party system and communication protocol according to some embodiments of the invention.

FIG. 3 is a block diagram of an example multi party system and communication protocol according to some embodiments of the invention.

Some embodiments of the invention may include broadcasting one or more of the reconstructed data points, the broadcasting using a public component of the blockchain entity.

For example, parties 302A-B may be connected via a write channel (which may be for example a slow write channel) to an example blockchain entity or party 'Pc' 304, which may include and/or act as a public bulletin board they may read from, using a public component or state 306. 'Pc' may have a public state 306 any one of the other parties may read from (e.g., using "broadcasts" or messages written, or sent to, or presented using the public component).

As further described herein, some embodiments of the invention may include receiving the data point from the first computerized signing entity using a private component of the blockchain entity, wherein the generating of data points of the blockchain entity is performed using the private component.

For example, being included as one of the computing parties, an example blockchain party 'Pc' may also maintain its own private state 308 which may for example include data and/or information items to which no other party may have access to. In some embodiments, an example blockchain party 'Pc' 304 may include a code execution part 310 (which may for example be implemented using the example platforms or frameworks described herein)—which may be responsible for executing or performing some of the protocols or procedures described herein, and may for example be considered as part of private component 308 according to some embodiments.

In some embodiments, private and public components may be implemented into hardware memory units of the relevant computerized entities. For example, the bulletin board or public component of the blockchain may be implemented in a plurality of memory units of a plurality of computerized systems (for example where at least one unit is associated with each signing entity)—and a private component may be implemented into one or more memory units associated with a single, relevant entity.

It should be noted that additional or alternative systems and/or communication protocols may be used in different embodiments of the invention.

According to some embodiments, the following advantages or improvements over prior or existing systems are provided.

Unstoppable wallets according to some embodiments of the invention may be for example programmable threshold ECDSA wallets where the counterparty co-signing transactions with the user (or a set of users) is not a singular third-party, but rather a confidential smart contract (which may for example be included or stored in the blockchain). In addition to being completely programmable, these wallets may ensure liveness (e.g., on the counterparty's perspective)—which may refer to the property ensuring that the contract may continue to function and execute its operations as expected, without getting stuck or becoming inactive, for example due to network congestion or unavailability issues.

A multi party protocol according to some embodiments may encapsulate the use of a confidential smart contract as both a party (e.g., making use of the private component of the blockchain entity) and a communication channel (e.g., using a broadcast or bulleting component, which may be for example a public component of the blockchain entity) in MPC protocols.

Some protocols according to some embodiments provided herein may improve technology for example by minimizing the number of required write operations (which may be referred to as write-complexity)—for example over previous or existing multi party key-generation and signing protocols. Communication and computation actions may be greatly reduced, and the use of expensive cryptographic primitives—for example such as Paillier encryption and costly zero knowledge proofs over Paillier ciphertexts—may be avoided or minimized.

Some embodiments of the invention may provide the desirable cryptographic features of fairness and robustness. Fairness may be achieved with no additional overhead even for n participating parties where 't<n' (where t may be the number of shares generated or held by the blockchain; see further description herein). Robustness may be achieved for example in the sense that if 't+1' parties agree to sign on a message (and hence participate in the protocol faithfully), then they may obtain the signed message.

Some of the protocols and procedures described herein may be implemented, according to some embodiments, as smart contracts in a functioning blockchain. It may be possible to measure their real world applicability in terms of, for example, gas costs and fees, and to show their computational cost scaling is desirable even when many signers are considered.

Various cryptographic approaches may be considered herein with regard to different embodiments of the invention, that may showcase the applicability of unstoppable wallets to a variety of use-cases that may not seem obvious at a first glance. It should be noted that additional or alternative approaches and/or techniques may be used in different embodiments.

In contrast to prior technology, some embodiments may be chain-friendly, meaning that they may aim to reduce the number of writes without resorting to heavyweight cryptographic tools such as for example homomorphic encryption (HE) and/or expensive zero-knowledge proofs that are likely too inefficient to run in a constraint blockchain environment.

Current state-of-the-art solutions, e.g., for an honest majority of parties typically achieves fairness in six writes, as opposed to for example 1-2 writes according to some embodiments of the invention; existing dishonest majority protocols (without blockchain assistance) are proven not to be able to achieve fairness at all.

As to robustness, some previous solutions are known to sacrifice robustness for additional efficiency gains. In some embodiments of the invention, the standard notion of robustness may be achieved, where signers in pre-signing and actual signing may be disjoint.

FIG. 4 shows an example comparison of protocols according to some embodiments of the invention with some previous systems and methods. It can be seen that some embodiments may provide computationally more efficient protocols, as may be reflected in the number of write operations, the scaling of the number of messages or operations with the number of parties n, the type of cryptographic primitives in use, and/or additional properties.

Some embodiments may consider a single signing party (i.e., 'n=1'). This may allow a single user to increase their wallet security by having 'Pc' as a co-signer. Some use cases, like wallet exchange (see further discussion herein), may be desirable under this setting.

Some embodiments may introduce the concept of a confidential smart contract, which may actively participate in an MPC protocol alongside other parties such as for example described herein.

As mentioned above, some previous systems and methods may require the use of expensive primitives (like homomorphic encryption or oblivious transfer) and often require at the very least four rounds of interactions or write operations. That kind of latency, and more importantly, the implied requirement from each user to sign four transactions in a row in order to produce a signature might be too burdensome in many practical applications.

Some embodiments may be chain-friendly, and may only require each party to write once (which can also be done non-interactively).

According to some embodiments, the blockchain may be considered, simulated, or modeled as an additional semi-honest and non-colluding party (e.g., in addition to parties P1, . . . , Pn), denoted 'Pc', and it may be assumed, for example, that an adversary may for example corrupt the majority of the parties 'P1, . . . , Pn'.

Some embodiments may assign 'n' shares to the parties, and 't' additional shares are held by 'Pc', for a total of 'N=n+t' shares. Protocols according to some embodiments may ensure that for example as long as there are 't+1' honest signers (or as long as the number of honest signers is above a threshold of 't+1'), a valid signature may be generated; otherwise, no information may be revealed.

In the protocols herein it may be described that a party 'Pi' may send a party 'Pj' a message, although it is understood that 'Pi' may only communicate through 'Pc'. That is, 'Pi' may for example send or transmit a ciphertext to 'Pc' under 'Pj''s encryption key, and then 'Pj' may decrypt that message (which may implicitly imply a public key infrastructure (PKI)).

A party or entity such as for example 'Pi' or P1 may be referred to herein as a first party (or as a first signing party or entity of a plurality of signing parties or entities, being for example the entities taking part in the blockchain network); parties 'Pj' or P2, . . . , Pn may be referred to herein as second parties or entities, as support parties or entities, as validators or validating entities, or merely as signing entities; and the blockchain or Pc may be referred to herein as the blockchain party or entity. It should be noted that some of the protocols described herein may refer to 'Pi' or P1 as an example—where similar operations may be performed by 'Pj' or P2 (which may accordingly be considered as "the first party"). It should also be noted that while parties may generally be referred to as "signing" parties or entities-they may be considered in contexts different from signing and/or executing a blockchain transaction (such as for example key generation protocols such as, e.g., described herein).

In some of the examples provided herein, data points or information items of various computerized may be denoted using appropriate variable notation, where for example $x_u$, $k_u$, and the like may denote data points of party P1, while for example $x_c$, $k_c$, and the like may denote data points of 'Pc'.

Sampling from a set or a field may be denoted using an arrow, such as for example $x_c \leftarrow Z$. Functions and their inputs may be denoted using functional notation such as for example SS.Share ($k_u$,t,N), where, e.g., items or elements $k_u$,t, N may be the inputs to the function SS.Share (denoting, e.g., Shamir's secret sharing protocol). Additional or alternative notation conventions, as well as relevant technical terminology used herein are known in the relevant arts.

FIG. 5 shows an example key generation protocol according to some embodiments of the invention.

Some embodiments of the invention may calculate, by one or more of the signing entities, a plurality of public key shares based on a secret key share of the first signing entity and a secret key share of the blockchain entity. In some embodiments, the public key shares are generated using an elliptic curve algorithm.

For example, in some embodiments, an example key generation or calculation protocol may be provided that begins with a joint random secret sharing generation protocol 502 having two share dealers: 'P1' and 'Pc'. An example random secret sharing protocol that may be used in some embodiments may be, e.g., Shamir's secret sharing (or "SS.Share"), although additional or alternative may be used in different embodiments. Considering blockchain or Pc as semi-honest and non-colluding, a more expensive coin-tossing protocol may be avoided. After both 'P1' and 'Pc' deal their shares, each party may calculate or compute their corresponding data points, being, e.g., final shares of the secret key '[x]i', and may send their share of the public key ('Xi:=[x]i·G') to 'Pc' (operation 504).

Some embodiments may include, resolving, by the blockchain entity, one or more of the public key shares.

For example, in operation 506, 'Pc' may resolve the different shares and ensure that all shares of the public key are consistent, for example by exponent interpolation. If any of the parties "cheated" or violated the protocol (which may generally refer to a party deviating or attempting to deviate from the protocol and not satisfy all rules and/or criteria; this may be discovered or determined, for example, if the public key shares are inconsistent), 'Pc' may abort the process and/or invalidate relevant keys; otherwise it may send or broadcast the generated public key 'X' to all parties, which may correspond to a successful execution or conclusion of the protocol.

In some embodiments, subsequent protocols and/or operations may be performed based on, or using keys generated according to some embodiments of the invention.

It should be noted that additional or alternative operations and/or protocols and procedures may be used in different embodiments of the invention.

FIG. 6A-B shows an example signing protocol according to some embodiments of the invention.

In some embodiments, randomness may be introduced to the relevant protocols, for example using t sharings of random values or variables (which may be newly generated and referred to as "fresh"), e.g., 'k, a'—and '2t' sharings of zero, which may be denoted as 'z, z''. Additional or alternative variables may be denoted using appropriate notation in some of the example protocols described herein.

In some embodiments, 'k' may be an ECDSA nonce, which may for example be a random value used during the signature generation process to introduce randomness and to ensure that each signature produced may be unique (for example even for the same message and private key pair used in signing). In some embodiments 'k' may be produced for every signature, and the other values may be used internally, e.g., to "mask" or add randomness and security to various shares or data points, such as for example the '2t'-shares that are the product of two 't'-shares.

Some embodiments of the invention may include generating, by a computerized blockchain entity, a plurality of data points of the blockchain entity, wherein the generating of data points of the blockchain entity is performed based on a data point from a first computerized signing entity of one or more computerized signing entities. As discussed herein, some embodiments may include receiving the data point from the first computerized signing entity using a private component of the blockchain entity, wherein the generating of data points of the blockchain entity is performed using the private component.

For example, a signature protocol according to some embodiments may begin with two-dealer operation or generation protocol 602, in which a two-dealer random secret-sharing protocol including 'P1' and 'Pc' may be used to generate and/or deal a plurality of shares or data points of information to a plurality of nodes in the network/chain. It should be noted that in some nonlimiting examples, data points generated by 'Pc' may be based on data points or shares received from 'P1' (e.g., where data points from 'P1' may be received by a private component of 'Pc'. For example, a data point such as R, which may be sent or broadcasted by 'Pc' to the plurality of signing entities may be calculated based on a data point or share Ru, which may be received from 'P1' using a private component of 'Pc'. It may be seen that similar data points or shares of 'Pc' may be generated (e.g., using a private component of 'Pc' such as, e.g. described herein) based on points, $k_u, a_u, z_u$, and the like, which may be generated by 'P1' as part of a secret sharing protocol according to some embodiments of the invention. Similar operations and/or components may be used in additional or alternative protocols (including, e.g., key generation protocols) according to different embodiments.

In some embodiments, the protocol may not check consistency of generated values (which may be preferable for reasons of computational efficiency). In fact, it may even be that the parties may hold inconsistent sharings, or that '$R \neq [k] \cdot G$'. In some embodiments, an adversary may not learn anything even if it cheats, and so it can only cause an aborting of the process or protocol by Pc, for example based on protocols and procedures described herein.

Some embodiments of the invention may include reconstructing, by the blockchain entity, one or more data points of the signing entities, the data points of the signing entities generated based on one or more of the data points of the blockchain entity.

For example, in operation 604, after the parties obtain their sharings from 'P1' and 'Pc', as well as '$r := R \cdot x$', they may locally generate or compute their data points being, e.g., shares of 's1, s2', such that '$[s1]i := [a]i(m+r[x]i) - [2]i \mod q$' and '$[s2]i := [k]i[a]i - [z']i \mod q'$. In some embodiments each 's1' and 's2' may have a multiplicative depth of one, meaning, e.g., that the resulting shares may be lifted from a degree 't' polynomial to a degree '2t'. In some embodiments, each party may also use their share of 'z, z'' to rerandomize their resulting shares. Each party may then send ('[s1]i, [s2]i') to 'Pc'. In operation 606, after receiving 't+1' shares, 'Pc' may generate additional 't' shares of these values, and having '2t+1' total shares of each, and may reconstruct 's1, s2' to obtain the final '$s := s1 \backslash : s2^{\{-1\}} \mod q$' (which may be performed, for example, in a private component of 'Pc' such as for example described herein).

Some embodiments of the invention may include broadcasting one or more of the reconstructed data points, the broadcasting using a public component of the blockchain entity.

For example, if '(r,s)' is a valid signature, 'Pc' may send or broadcast it to all parties (e.g., using a public component of 'Pc' such as for example described herein). Otherwise, 'Pc' may send an error message and/or abort the process (and for example not perform or prevent an exchange of data such as for example described herein from taking place).

Following the producing of a valid signature, embodiments may include, e.g., performing of an exchange of data between one or more of: the blockchain entity, and one or more of the signing entities based on one or more of the reconstructed data points or signatures, such as for example described herein.

In some example protocols and/or operations according to some embodiments of the invention, at least one of: the generating of data points of the blockchain entity, the reconstructing of data points of the signing entities, and the performing of an exchange of data are performed based on the resolved public key shares—e.g., as provided in key generations protocols according to some embodiments of the invention. For example, private and/or public keys $xi, X$, and the like used in the signing protocol may be, e.g., the private and/or public keys generated in key generation protocols such as for example described herein.

It should be clear that the protocol may take only a single write (for producing the signature) by each party. The only exception may be the dealer 'P1', who may write twice (and can be pre-processed).

In some embodiments, this may be reduced to a single write if when producing the 'i'-th signature, 'P1' may deal random values for the 't+1'-th signature; this may require revealing the next 'R' a-priori.

Some embodiments may provide or offer fairness as a desirable cryptographic feature, since they may make sure that the first party to see a valid signature may be 'Pc', which is known or assumed to follow the protocol. Therefore, if 'Pc' releases the signature to others, then it may be known or assumed that it is indeed a valid signature.

It should be noted that additional or alternative operations and/or protocols and procedures may be used in different embodiments of the invention.

According to some embodiments, key generation and signing protocols may be securely computing the ECDSA functionality with perfect security (which may allow aborting or terminating an exchange of data in real time, e.g., in case inconsistencies or threats are detected), against a static malicious adversary who may corrupt at most 't' parties (being, e.g., the majority of parties) of 'P1, . . . , Pn' or a semi-honest adversary who corrupts 'Pc'. In this context, "corrupting" may refer to tampering with data, keys, algorithms, systems, or trust relationships to compromise the security and/or robustness of the blockchain system or network—which may for example involve altering relevant data, compromising keys, exploiting vulnerabilities in algorithms, disrupting system infrastructure, and the like.

Some embodiments may include simulating, by the blockchain entity, one or more computerized operations, the simulated operations associated with one or more of the data points of the signing entities. In some embodiments, the simulated operations comprise one or more pseudorandom values, and wherein the simulated operations describe an adversarial computerized behavior by one or more of the signing entities.

For example, according to some embodiments, it may be possible to simulate an adversary, and/or the adversary's view or behavior, and/or other nodes or parties in the blockchain network (e.g., Pc, P1, . . . , Pn), for example by picking random or pseudorandom values for its shares.

Several blockchain development platforms provide tools for simulating adversaries or adversarial computerized behavior and conducting security testing and analysis according to some embodiments of the invention-including, for example, tools such as for example Ganache and Truffle by Ethereum, Hyperledger Caliper by Hyperledger Fabric; SDKs and Testnet by EOSIO; the Smart Contract Debugger and TestNet by NEO; SmartPy by Tezos; additional Binance Smart Chain tools, and the like. In some embodiments of the invention, a simulator and/or a simulation of nodes or parties may itself be implemented in the blockchain or blockchain network (e.g., using some of the tools or platforms mentioned herein), and may be embedded in some protocols and procedures according to some embodiments of the invention—although additional or alternative tools may be used in different embodiments.

One challenge may be to align all parties' shares (those of the adversary as well as those of the honest parties) with the values obtained in from the ECDSA functionality (like the public key 'X', the random nonce 'R' and the signature 's'), in which case it may be needed to make sure that the adversary's share are consistent with the those values, and then, e.g., to 'interpolate' the other parties' shares to reside on the same, fully determined, polynomial.

Another challenge may be that an entity, e.g., 'Pu' may pick or possess a secret and may share it first (before this is done by 'Pc'), however, when simulating 'Pc', one may need to know 'Pc''s secret (be it 'xc' in the key generation protocol or 'kc' in the signing protocol) before simulating 'Pu''s dealing. In some embodiments, 'Pc' may be instructed to derive its secret from 'H' (which may be a group derived from points on the relevant elliptic curve in an ECDSA framework), which may be modeled or simulated as a random oracle (e.g. providing random and unique outputs for every distinct input).

Interestingly, since 'Pc' may be semi-honest (and may be constructed or modeled to follow the protocol, as opposed to, e.g., being configured not to follow the protocol in its entirety and/or to act in a malicious manner) it may be possible to program the random oracle a-priori. That is, it may be possible to choose the secret values 'xc' and 'kc' on behalf of 'Pc' even before it queried the random oracle for them. This may not be possible if 'Pc' is malicious—since 'Pc' may, in this case, query the random oracle multiple times (or not at all), and the simulator could not know which one was the "right" one—e.g., queried secrets 'Pc' actually used (if existing at all).

It is noted that that some protocols according to some embodiments may be described in a way that may be secure, e.g., in a standard MPC model, and/or without a random oracle—for example by having 'Pc' commit to a pseudo-random function (PRF) key as a first step in the key generation protocol; this PRF may then be used as a random oracle. The simulator may extract that PRF key, as it takes the role of the commitment functionality, and may reproduce any value that 'Pc' produces during the protocol.

Key generation signing protocols according to some example embodiments may be fair, but not robust. They may be fair because either all or none of the parties 'P1, . . . , Pn' obtain the result verification key 'X' and signatures. However, robustness may not be guaranteed if, for example, 'P1' cheats in its dealing, then the protocols abort or terminate, and accordingly the parties may not learn the public key or signatures.

In some embodiments, robustness may be achieved, for example, by using a publicly verifiable secret sharing, for example, using two different approaches: (1) letting 'P1' be the only dealer (apart from 'Pc'), and if it "cheats" or deviates from the protocol, repeating (e.g., iteratively) with 'P2' as the dealer, and so on. This process may end by at most 't+1' writes, as at least one of 'P1 . . . , P{t+1}' may be honest; (2) Letting all 'P1, . . . , P{t+1}' be dealers simultaneously which may ensure that by one write this dealing may complete. The first approach may entail only one party to write to the blockchain, and the overall protocol's message complexity may be 'O(n)' (i.e., it may be considered that 'Pi' sending a share to 'Pj' as one message); in the worst case there may be 'O(t)' rounds and 'O(n^2)' messages. In the second approach there may be still 'O(n^2)' messages, but they all happen in parallel and so this approach may be completed in one round.

FIGS. 7A-C show example of publicly verifiable secret sharing based key generation and signing protocols according to some embodiments of the invention.

In a manner similar to other protocols and procedures described herein, a process may begin with a two-dealer protocol or operation 702, in which a two-dealer random secret-sharing protocol including 'P1' and 'Pc' may be used to compute and/or generate and/or deal and/or broadcast a plurality of shares or data points of information to a plurality of nodes in the network/chain. In operation 704, public keys may be computed (e.g., using an elliptic curve digital signature algorithm, similarly or analogously to some example protocols described herein).

Additional or alternative key and/or signature generations steps and operations may be included in some embodiments, such as for example demonstrated in FIG. 7 (e.g., as part of an example two-party dealing procedure 712).

It should be noted that ensuring correctness of sharing may not be sufficient for robustness—the computation of the partial signatures by each party (e.g., using the elliptic curve framework, for example according to 's1=a(m+rx)' and 's2=ka', e.g., in operation 706) may have to be ensured to be computed correctly.

Since these values may be the result of a non-linear function, they may not be verified against existing values, 'm,r,A,K' and 'X', that may already be public.

According to some embodiments (e.g., in operation 706), the parties may provide additional auxiliary information 'M1' and 'M2', such that 'M1=log (A): log (X). G' and 'M2=log (A): log (K). G', then, everyone can check that 's1' and 's2' are computed correctly by verifying the equalities 's1·G=r·M1+m. A' and 's2·G=M2'.

Some embodiments may resolve data points such as, e.g., keys or shares, and/or verify that shares or points of information such as, e.g., 'M1' and 'M2' may be computed correctly (e.g., in operations 708-710). This may be done, in some embodiments, by having the parties provide a simple zero-knowledge proof that '(A,X,M1)' and '(A,K,M2)' are Diffie-Helman tuples (DHT). Other verification protocols may be used in different embodiments.

In some embodiments, a publicly verifiable secret sharing (PVSS) protocol, such as for example according to Shoemaker's PVSS framework, may be used for various computations—e.g., of 'Pc', in procedure 712—for example in order for the public values required for the messages of parties '1, . . . , n' to be publicly verified.

It should be noted that additional or alternative operations and/or protocols and procedures may be used in different embodiments of the invention.

According to some embodiments, robust ECDSA protocols are provided. Assuming the decisional Diffie-Helman (DDH) problem is hard relative to '(\GG,G,q)' (where \GG may denote a macro comment set to denote a mathematical group; see also nonlimiting code examples below), key generation and signing protocols according to some embodiments may securely compute the ECDSA functionality or algorithm with guaranteed output delivery, for example against a static malicious adversary who may corrupt at most 't' parties (which is the majority of) of 'P1, . . . , Pn' or a semi-honest adversary who may corrupt 'Pc'.

In addition to the challenges aforementioned above (e.g., for additional or related example protocols) according to some embodiments—which may be solved in the same way as described herein-simulating the robust protocol may introduce a new challenge because the use of Shoemakers's PVSS scheme, which may involve El-Gamal encryptions (which may be, in some example cases, computationally quite costly). This extra challenge may be introduced when 'Pc' may be corrupted; when it is not (for example even in a case in which a subset of 'P1, . . . , Pn' may be corrupted) the simulator may simulate 'Pc''s messages, which may not be publicly verifiable, but may be guaranteed to be correct given that 'Pc' behaves honestly; thus, there may be no need to, for example, simulate encryptions of unknown plaintexts. In contrast, when 'Pc' is corrupted, there may be a need to simulate publicly verifiable messages from parties 'P1 . . . , P{t+1}'; let us focus on one of them, 'Pu'.

Some embodiments may include simulating, by the blockchain entity, one or more computerized operations, the simulated operations associated with one or more of the data points of the signing entities.

For example, in some key generation protocols according to some embodiments, a "simulator", or simulated party (which, as noted herein, may be implemented in code execution on chain, e.g., using a private component of the blockchain or blockchain network) may know the public key 'X' (as received from the ECDSA functionality or algorithm) as well as the complementary part of the public key 'Xc' (which may be extracted for example as described herein), therefore the simulator may know 'Xu=X−Xc'. However, the simulator may share 'xu=\log (Xu)', for example using the PVSS scheme. In some embodiments, generating of a signature share or the reconstructing of the signature share with the second signature share are performed using a publicly verifiable secret sharing (PVSS) protocol, such as for example using Shoemakers's PVSS scheme. In contrast to, e.g., non-publicly verifiable secret sharing where each receiver may receive its own share only, in PVSS the dealer may have to broadcast the encryptions of all shares under their respective key, and prove that they are consistent with a given commitment (e.g., to a given polynomial). In this case, the simulator may not know 'xu' and so it cannot produce a polynomial 'P' s.t. 'P(0)=xu'. Instead of providing encryptions of the shares 'P(1), . . . , P(N)', which may be unknown to the simulator, the simulator may pick random shares '[xu]{n+1}, . . . , [xu]N' intended for 'Pc' and may, e.g., subsequently encrypt them using an appropriate cryptographic encryption protocol (such as for example a triple data encryption algorithm or using hashes, and/or additional or alternative encryption techniques). Then, the simulator may produce the commitment to the polynomial 'A0, . . . , At', where 'A0=Xu' since the polynomial must evaluate to 'xu' at 0, and the values 'A1, . . . , At' are computed from the linear system with 't' equations and 't' variables, where the 'j'-th equation may be '$\Sigma_{j=0}^{t} i^{j} \cdot Aj=[xu]i \cdot G$'.

By solving that system the simulator may obtain 'A1, . . . , At' and so it may have all information required to make all 'Pc''s values be consistent with 'X' and 'Xc'.

Finally, for the encryptions of parties 'P1, . . . , Pn', that are also sent to 'Pc', the simulator may encrypt the value 'Zq', which is indistinguishable from an encryption of the actual value 'P(i)' that may be encrypted, for example, from the chosen-plaintext attack (CPA) security framework of El-Gamal.

Additional or alternative protocols and/or operations or steps (including, e.g., ones considered herein with regard to additional or related protocols) may be included in different embodiments of the invention.

Some chain-assisted protocols according to some embodiments may support a group of signers. It may therefore be needed to use a different protocol between a single user and 'Pc' directly. This may, in some cases, be reduced to a two-party ECDSA protocol between a user 'Pu' and 'Pc'.

Some protocols and procedures according to some embodiments may consider or model at least one of the parties to be semi-honest, which may allow gaining some performance improvements for this setting as well.

In some embodiments, 'Pc' may be only an assistant, and party 'Pu' may be the only one who can ask for key generation or signatures.

FIGS. 8A-B show example two party key generation and signing protocols according to some embodiments of the invention.

Various tools and techniques described herein may be employed for extracting 'Pc''s secret inputs 'xc,kc', e.g., as done in some of the example multiparty protocols described herein. However, some operations or steps may be replaced with, for example, different MPC model equivalents using a commitment on a PRF key. Some example two-party protocols according to some embodiments may include performing a preliminary randomness setup; generating Paillier key-pairs; performing Paillier encryptions; and performing zero-knowledge proofs by 'Pu' and/or 'Pc' for providing desirable security features, such as for example described in FIG. 8.

Since 'Pc' may be semi-honest, it may be configured and guaranteed to choose its nonce randomly and independently of 'Pu''s message. In this way, two-party protocols according to some embodiments may allow for non-interactive signing, or in other words, may require only one write. That fact may also enable simulation of both parties without an additional non-standard 'Paillier-elliptic curve' (or Paillier-EC') assumption. The reason for that is that 'Pc' may be assigned the role of the party who performs the linear evaluation on the encryption of 'Pu''s secret key share 'ckey'.

Since 'Pc' may be configured follow the protocol's description, it may be guaranteed to not cheat and produce an encryption of '(kc)^{-1} (m+xr)' exactly as described. This may remove the need of (1) guessing whether 'Pc' will abort the process or not, (2) adding an expensive zero-knowledge proof on 'Pc''s last message, or (3) relying on non-standard assumptions such as, e.g., Paillier-EC.

According to some embodiments, the key generation and signing protocols may be securely computed using the ECDSA functionality such as for example described herein, against, for example, a static malicious adversary who corrupts Pu' or a semi-honest adversary who corrupts 'Pc' (which may for example be simulated such as, e.g., described herein). In case of inconsistencies or security breaches or "cheats", the protocol may be terminated or aborted (for example by 'Pc') as, e.g., described herein.

It should be noted that additional or alternative operations (including, but not limited to, for example ones described elsewhere herein) and/or protocols and procedures may be used in different embodiments of the invention.

Figure 9:
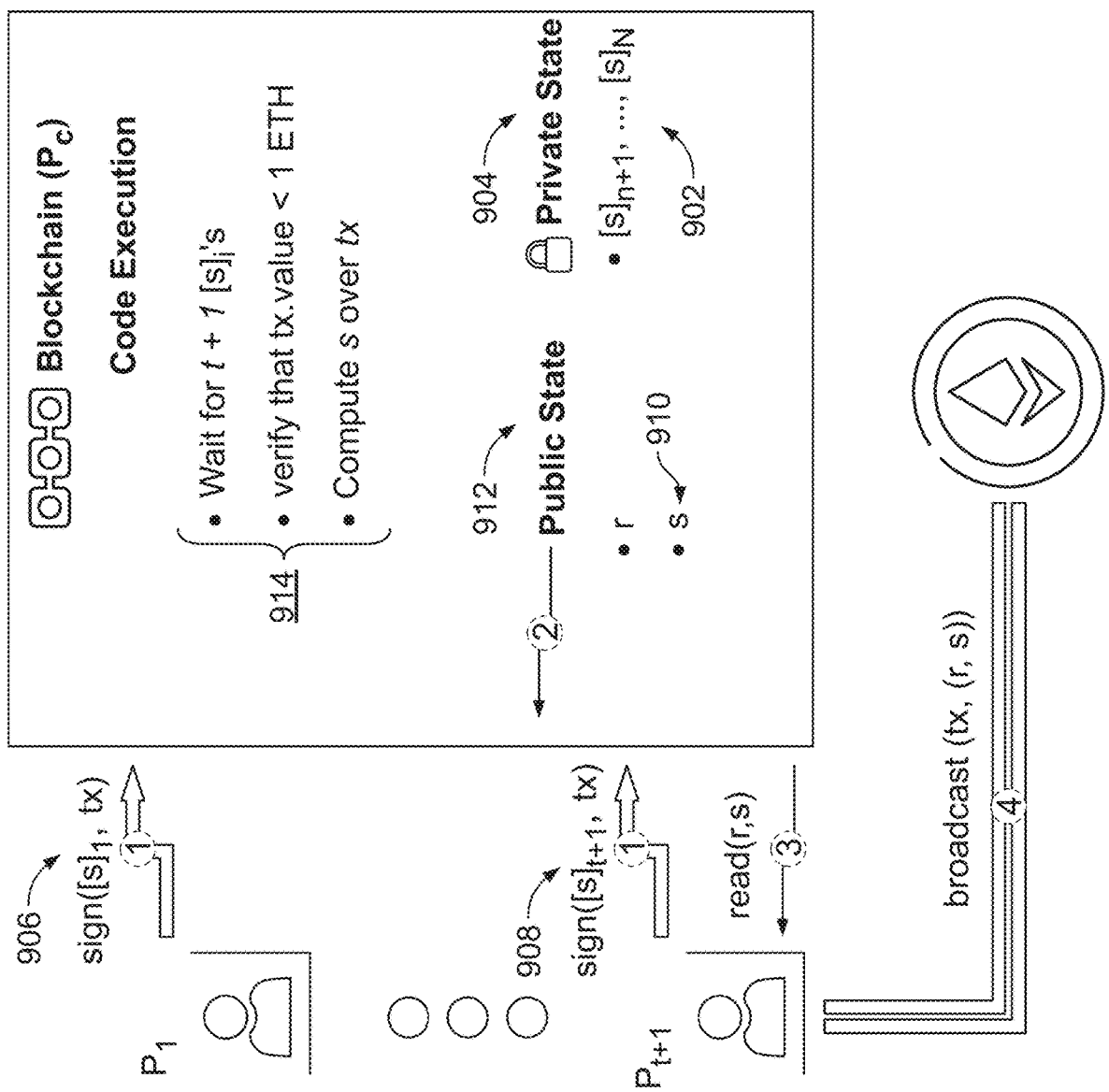
FIG. 9 shows an example system for performing secure exchanges of data according to some embodiments of the invention.

FIG. 9 shows an example system for performing secure exchanges of data according to some embodiments of the invention.

According to some of the protocols described herein, example data points or shares of the blockchain entity may be for example element 902, and may be kept in private state 904 of the blockchain entity. An example data point (which may be or may represent, for example, a key or signature share, and which may be used according to some example procedures described herein) from a first computerized signing entity may be for example element 906. Example data points or shares from a plurality signing entities may be seen, e.g., in element 908 (by a signing party t). An example reconstructed data point may be, e.g., element 910, which may for example be kept in public state 912 of the blockchain entity or network such as for example described herein. Example operations by the blockchain entity may be implemented on chain, e.g., in code 914 which may include, e.g., generating and/or resolving data points, simulating operations, and the like, such as for example described herein.

Some embodiments of the invention may include performing of an exchange of data between one or more of: the blockchain entity, and one or more of the signing entities based on one or more of the reconstructed data points. Some example exchanges of data and/or additional use cases are further described herein.

Unstoppable wallets according to some embodiments may serve as a foundational component for a diverse array of applications. Nonlimiting example applications may be deployed, for example, to the Secret Network 'mainnet' environment under dedicated contract addresses such as, e.g.:

(1) secret1lge6kdh078u7yc778whz8wjdc39ce78knqjfjh;
(2) secret1lkvhyg4723fxrecyrm0mk7pkzgd4qaztmx4ztw.

Some example wallets according to some embodiments may be governed by a smart contract, meaning that they may have all kinds of use-cases, e.g., additional or alternative to ones described herein.

Some embodiments of the invention may provide multi-signature digital wallets or smart contracts which may include policies and/or conditions and/or criteria and their verification.

For example, in the traditional banking system, accounts often have various checks and limits on spending to enhance security and control. One can imagine a similar use case for cryptocurrency transactions, integrating such checks and constraints within a multi-signature (or 'multisig') wallet (such as for example wallets according to some embodiments of the invention).

Threshold ECDSA protocols according to some embodiments may support a multi-signature transaction approval structure, which may necessitate '(t+1)'-out-of-'n' parties to endorse or sign a transaction. On top of this, with unstoppable wallets according to some embodiments, further layers of spending policies may be introduced into the smart-contract, such as per-transaction spending limits, daily spending limits, or a combination of both (such as for example a daily spending limit of 0.3 ETH, a global limit of 1.5 ETH, and the like). Such policies may offer increased control and security over transactions involving cryptocurrency (and may be implemented, for example, in code or execution block 914 of a given chain or wallet).

There may be elaborate schemes and use-cases according to some embodiments that may benefit from the blockchain's role as a public bulletin board. For example, decentralized autonomous organizations (DAOs) may be assumed to be governed by all token holders, but their treasuries are in practice controlled by a small committee of signers. By leveraging unstoppable wallets, a plurality of parties may define clear spending limits (such as, e.g., the example limits or thresholds provided herein) in a smart contract to prevent a DAO committee from abusing their mandate.

To demonstrate the concept of a multisig wallet with policy checks, an example digital wallet or smart contract according to some embodiments may for example be developed that may not only require a quorum of at least 't+1' approvals, but may also, e.g., verify the transaction as a valid Ethereum transaction with a spending limit of 1 ETH. Additional or alternative examples or use cases may be considered by different embodiments of the invention.

Some embodiments of the invention may provide systems and methods for digital wallet exchange.

In some known use cases, users, entities or parties may exchange cryptocurrency units. For example, two entities or parties may be swapping units of bitcoins (BTCs) for Ethereums (ETHs). However, instead of exchanging digital assets, what if users may be able to exchange the digital wallet or entire relevant blockchain system or network? Such technical feature or possibility may be desirable in some nonlimiting example, such as involving transactions for assets that do not yet exist, or that have a certain lockup or locking mechanism, making transferring or transacting of the asset itself infeasible or undesirable. Additional examples driving the need for wallet exchange according to some embodiments of the invention may be realized.

Embodiments may provide or enable, e.g., a wallet exchange framework or technique that may allow entities—such as a first entity or entities which may also be referred to as a "source" entity or entities—to exchange their digital wallets or, e.g., entire blockchain systems instead of their assets—e.g., with "destination" entity or entities. According to some embodiments, the first or source entities may lose access to the blockchain network or digital wallet after the transaction or exchange concludes.

Some embodiments may provide a smart contract that may enable exchanging or transferring a wallet from a first entity to a second entity (which may be for example an entity initially not taking part in the blockchain system or network, or having no access to the blockchain system or network, which may be or may include a remote computer or a computer remotely connected to a relevant blockchain party over a data network). In some embodiments, an exchange of data comprises excluding the first entity from the blockchain network.

For example, the digital wallet or blockchain system may comprise the first entity and the chain itself (including, e.g., 'Pc' such as for example described herein). A second entity may communicate (e.g., send or transmit a message or command over a data network) with the smart contract governing the wallet, which the first entity may either respond to or ignore. The second entity may for example request a wallet or blockchain system exchange with the first entity, and for example set or determine a timeout (e.g., of 2 weeks) to release or cancel the request if they have not received a response from the first after the timeout period. If the first entity accepts the request, the first entity may encrypt or re-encrypt their share or shares of the relevant key with the keys of the second entity (which may for example be received as part of the wallet exchange request) and send it to the contract (e.g., to 'Pc')—which may for example follow up to conclude the exchange of the wallet, or the "change of hands". The chain or 'Pc', e.g., after verifying that neither party has cheated (for example according to some of the example protocols or procedures described herein), may then perform the required operations for refreshing the shares and revoking the first entity's share. The contract (or the blockchain party 'Pc') may finalize the exchange, thus completing the wallet exchange process securely, which may include additional or alternative operations and/or procedures such as for example described herein.

In one nonlimiting example, a two-party or two-entity protocol such as for example provided herein may be used or be included in some example wallet exchanges according to some embodiments of the invention, where, e.g., the first party may be required to sign the exchange or "change of hands" using two-party protocols between the first party and 'Pc'. After validating of the signatures, 'Pc' may encrypt, transform, or convert relevant shares and/or keys, using a key received by the second entity-such that the keys and/or shares of the first entity may no longer be valid, and only the second entity may have access and/or credentials to participate in blockchain operations on the blockchain network. In other words, 'Pc' may conclude the wallet exchange by excluding the first entity from the blockchain system or network, and introducing the second entity into the network. In this context, encryption or re-encryption may include various encryption protocols and procedures such as, e.g., the ones mentioned herein.

Additional or alternative wallet exchange protocols (including, for example, multi-party protocols) which may include excluding entities from the blockchain network and/or introducing entities into the network may be used in different embodiments of the invention and may include, e.g., the various procedures and/or operations described herein, and/or additional or alternative operations.

Some embodiments may include performing automated actions by a computerized system following a signing of a blockchain transaction or exchange of data. For example, in some embodiments, after a valid signature has been produced, the smart contract or chain (e.g., entity 'Pc') may be configured to automatically send or transmit files and/or requests and/or commands, for example over a data or communication network, to a remote or physically separate computer system—which may for example not be part of the blockchain system or network. Upon receiving the file/request/command, the remote computer system may automatically perform computerized operations according to the contents or specifications of the file/request/command. Various request or command formats may be used in different embodiments.

Threshold ECDSA protocols according to some embodiments of the invention, e.g., as used in key generation protocols, signing protocols, and protocols for a single user or two parties such as for example described herein may be implemented in various multi party system including different computer system such as for example described herein. Energy and/or gas costs associated with on-chain transactions may be the main performance bottleneck in addition to the number of consecutive writes each user has to perform; practical aspects of implementing cryptographic primitives on a (privacy-preserving) blockchain may include or relate to a performance analysis in terms of gas costs. Embodiments may be applied to applications other than energy.

Some example implementations of protocols and procedures according to some embodiments may be optimized for and/or be based on the secp256k1 curve. However, some example implementations may be extended to support other curves as well. Some example implementations may be divided into two main parts: local execution by users or parties, and on-chain execution on the blockchain. Example code according to some embodiments may written using the Rust blockchain programming language, but it is important to note that any language could be used for the client.

For on-chain parts and/or protocols according to some embodiments, a blockchain that supports confidential smart contracts may be needed. In some embodiments, the Secret Network platform may be an example blockchain based platform built on top of Cosmos SDK and Tendermint consensus algorithm, and featuring a smart contract framework based on CosmWasm, which may enable developers to write and deploy smart contracts using the Rust language, which may ensure compatibility with the local execution part of some of the example protocols described herein. Communication between entities or users and the blockchain may be established directly through exchanges of data or data transactions, e.g., on chain, which may be used for broadcasting data and writing it into the chain's state, and queries, which may facilitate data retrieval from the chain's current state. In some nonlimiting cases, transactions or exchanges may be writes (and are therefore slow), and queries may be reads.

In order to allow the protocols to run inside of a smart contract, it may be needed to implement several cryptographic building blocks in a way that allows them to run on-chain. For example, it may be needed to provide libraries that may comprise or include relevant cryptographic primitives, and that may support secret sharing (for example over secp256k1's specified field), elliptic curve operations (for example over the same curve), and Paillier encryption.

This may require making sure these building blocks are efficient, do not use randomness generated by the operating system, and do not use floating-point types. Relevant libraries may be modified to take in a custom pseudorandom generator (PRG) instead of using, e.g., the operating system's default PRG; this may be used as a hook to plug in a deterministic PRG that is purpose-built, e.g., for Secret Network contracts.

Additional or alternative example implementations may be used in different embodiments of the invention.

The performance of some example threshold ECDSA protocols may be assessed by focusing on gas costs associated with on-chain transactions. Gas costs may represent the computational resources necessary to execute a transaction on a blockchain, and are a popular cost metric on all smart-contracts chains, such as for example Ethereum. These costs may not only reflect monetarily resources but also impose limitations on the number of gas-intensive transactions a blockchain can process in a single block, as blockchains may have inherent constraints in terms of computational resources.

FIG. 10 shows example benchmarks for multiparty ECDSA and two-party ECDSA according to some embodiments of the invention.

An example evaluation for 'n=5', 't=4', marks the contract's initialization (for each wallet we deploy a different contract), the key generation may be the dealing portion of the key generation protocol, "presign" may mark the dealing part of the signing protocol where shared randomness and the nonce may be produced, and "sign (i)" may mark the cost for each signing party. On a per user basis, the costs may be negligible at the time of writing, and amount to roughly one-tenth of a cent per user (with the exception of the dealer who may pay roughly three-tenths of a cent). It may also be useful to compare the unitless gas used metric between threshold wallets and other common types of smart contract executions. It may be seen that results may be desirable for an MPC protocol implemented on-chain according to some embodiments.

FIG. 11 shows example baselines cost estimates for gas according to some embodiments of the invention.

The costs may scale very well (practically linearly, as expected) with the number of parties, making this scheme highly efficient in terms of scalability.

Figure 12A:
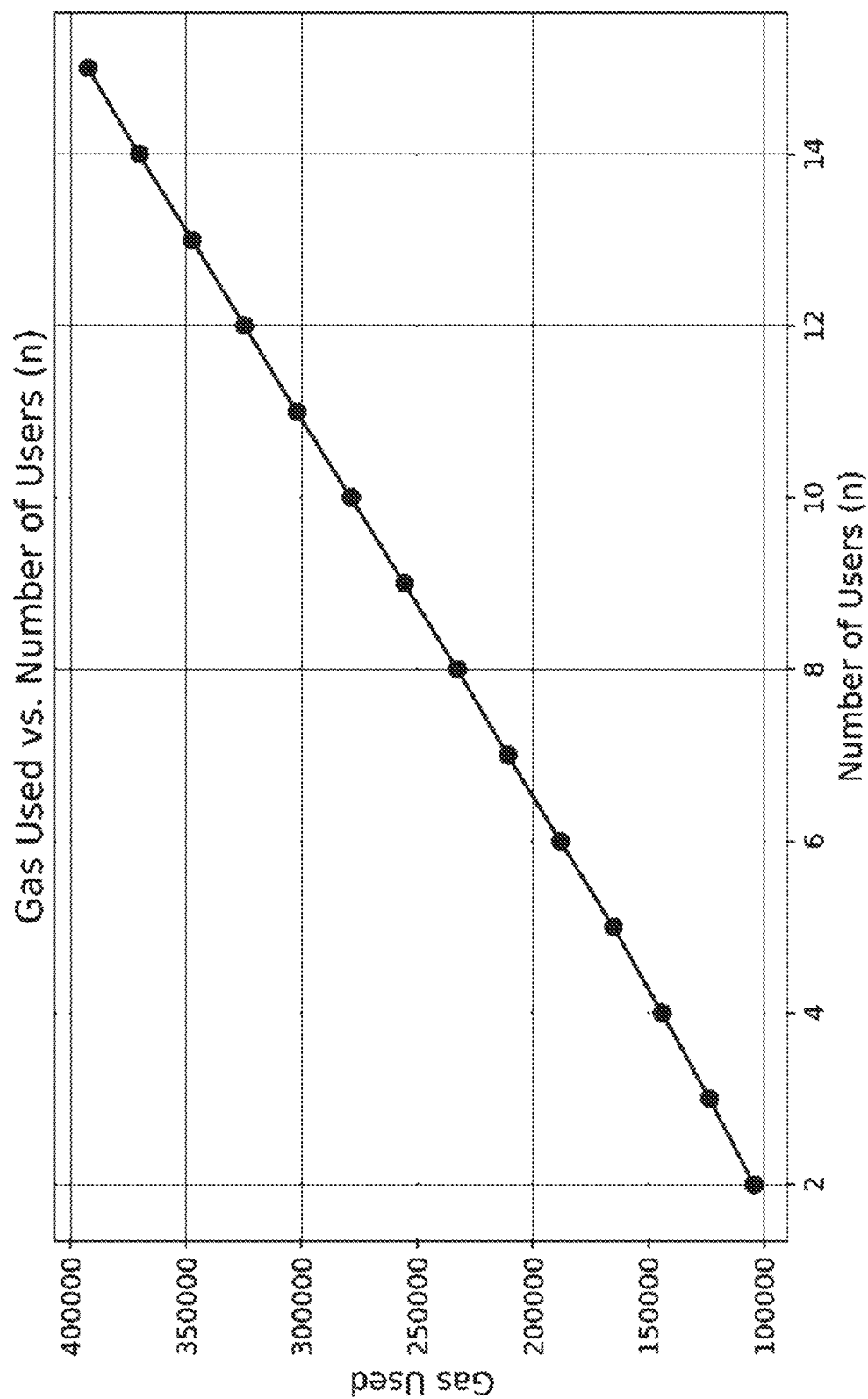
FIG. 12A-B shows example average gas expenditure changes per party: gas used vs. number of users, and gas used vs. threshold t for 15 users, respectively, according to some embodiments of the invention.
Figure 12B:
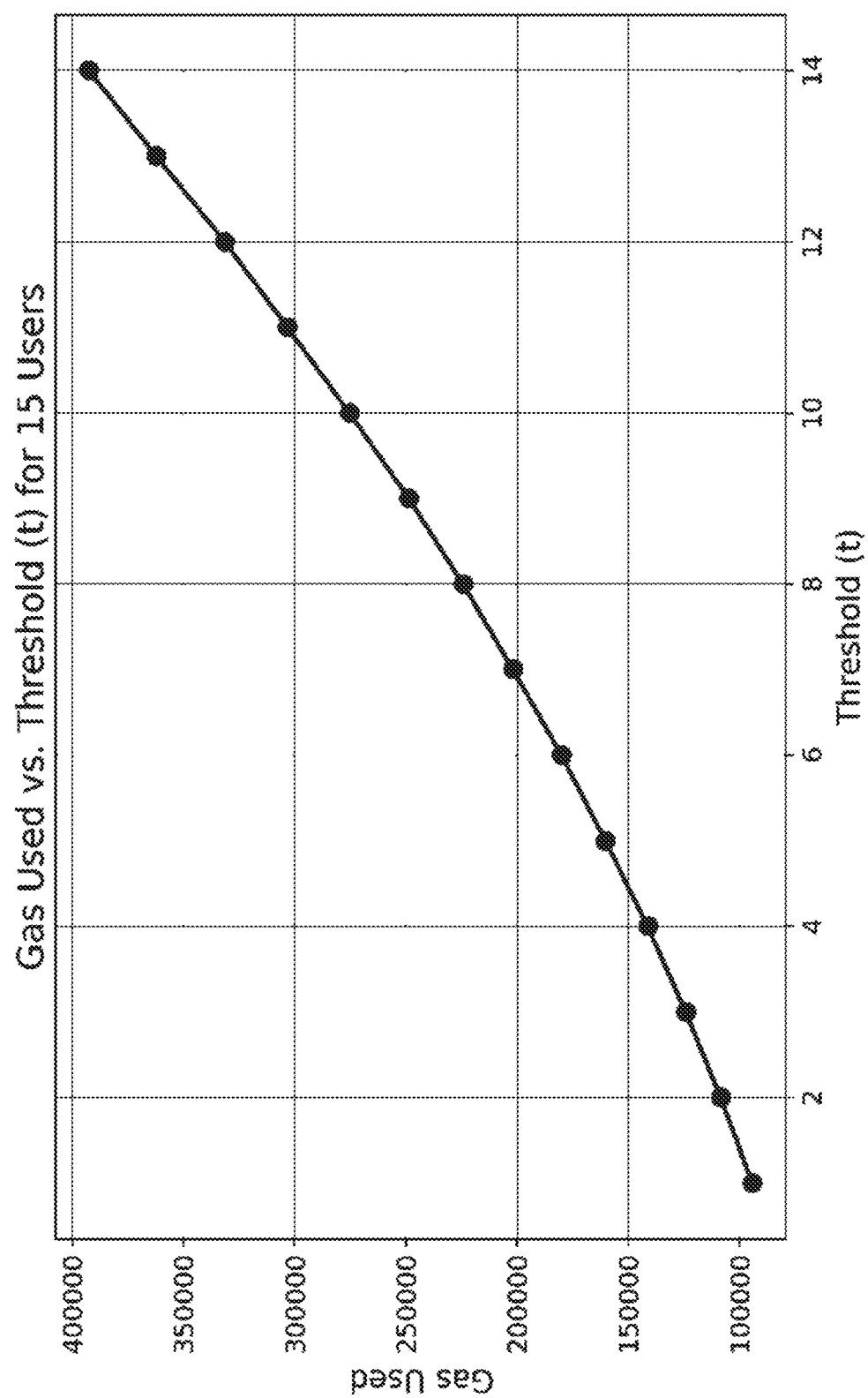

FIG. 12A-B shows example average gas expenditure changes per party: gas used vs. number of users, and gas used vs. threshold t for 15 users, respectively, according to some embodiments of the invention.

This close-to-linear relation may be kept assuming the maximum corruption threshold of 'n=t-1'). The same comparison is made for a fixed 'n=15' and a dynamic threshold describing a similar result.

Interestingly, example performance evaluations reveal that the multiparty protocol, even when accommodating numerous parties, may incur lower costs per party compared to the two-party protocol. This finding may be attributed to the relatively resource-intensive Paillier encryption considered with regard to some of the protocols described herein, which may be used for a single user scenario according to some embodiments. It is also worth mentioning that the expensive zero-knowledge proofs necessary for this protocol on-chain may not be implemented, which would undoubtedly widen the gap even more. Based on these example results, and assuming the maximum amount of corruptions, it may be extrapolated that it may take around 'n=82' users for the gas costs of the multiparty protocol to match the two party one.

Also, given current gas limits in platforms such as, e.g., Secret Network, and given that some protocols may require even more homomorphic operations and many more zero-knowledge proofs, it may be assumed previous and existing multiparty protocols would not even run on-chain. These results support the need of devising chain-friendly threshold ECDSA protocols.

In conclusion, practical and useful chain-assisted computerized protocols for Multi-Party Computation (MPC) protocols are provided according to some embodiments. Embodiments may improve technology by achieving improved performance compared to existing solutions.

Figure 13:
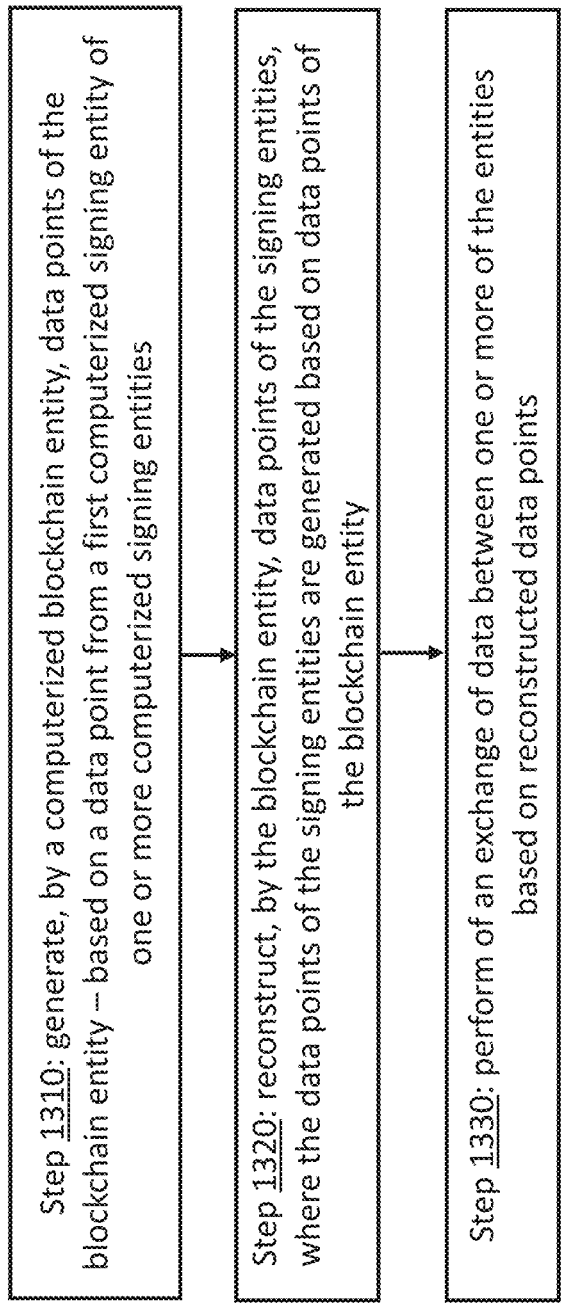
FIG. 13 shows an example method of performing secure exchanges of data over a computer network according to some embodiments of the invention.

FIG. 13 shows an example method of performing secure exchanges of data over a computer network according to some embodiments of the invention. In step 1310, some embodiments may generate, by a computerized blockchain entity, a plurality of data points of the blockchain entity—for example based on a data point from a first computerized signing entity of one or more computerized signing entities. Some embodiments may then reconstruct, by the blockchain entity, one or more data points of the signing entities, where the data points of the signing entities may be generated based on data points of the blockchain entity (step 1320). Some embodiments may then perform an exchange of data between one or more of the relevant entities based on reconstructed data points (e.g., between the blockchain entity and one or more of the signing entities, and/or between one or more of the signing entities, and/or additional or alternative computer systems which may for example be remotely connected to one or more of the relevant entities over a data network; step 1330).

Additional or alternative protocols and procedures using different operations may be used in different embodiments of the invention.

Nonlimiting code examples according to some embodiments are provided in Tables 1-6.

Tables 1-2 show a nonlimiting code example for a pre-signing and key generation procedure according to some embodiments of the invention (including, e.g., calculating and resolving key shares by the blockchain entity or 'Pc').

TABLE 1

```
fn create_presig(
    deps: DepsMut,
    _env: Env,
    _info: MessageInfo,
    user_public_instance_key: String,
    k_user_shares: Vec<Share<Secp256k1Scalar>>
    a_user_shares: Vec<Share<Secp256k1Scalar>>,
    user_zero_shares1: Vec<Share<Secp256k1Scalar>>,
    user_zero_shares2: Vec<Share<Secp256k1Scalar>>,
) -> Result<Response, CustomContractError> {
    let mut state = load_state(deps.storage)?;
    let total_shares = state.num_of_users + state.threshold;
    if k_user_shares.len( ) != total_shares as usize {
        return Err(CustomContractError::Std(StdError::generic_err(format!(
            "Wrong number of user shares provided: { } vs expected: { }",
            k_user_shares.len( ),
            total_shares
        ))));
    }
    if a_user_shares.len( ) != total_shares as usize {
        return Err(CustomContractError::Std(StdError::generic_err(format!(
            "Wrong number of user shares provided: { } vs expected: { }",
            a_user_shares.len( ),
            total_shares
        ))));
    }
    if user_zero_shares1.len( ) != total_shares as usize {
        return Err(CustomContractError::Std(StdError::generic_err(format!(
            "Wrong number of user shares provided: { } vs expected: { }",
            user_zero_shares1.len( ),
            total_shares
        ))));
    }
```

TABLE 1-continued

```
if user_zero_shares2.len( ) != total_shares as usize {
    return Err(CustomContractError::Std(StdError::generic_err(format!(
        "Wrong number of user shares provided: { } vs expected: { }",
        user_zero_shares2.len( ),
        total_shares
    ))));
}
// generate chain secret key
// rand = info.random;
// let rng = Prng::new(rand.as_slice( ), b"");
let mut rng = Prng::new(b"gm", &[ ]);
let k_chain = Secp256k1Scalar::random(&mut rng);
let a_chain = Secp256k1Scalar::random(&mut rng);
// generate chain public key
let chain_public_instance_key = Secp256k1Point::generate(&k_chain);
// Calculate sum of public keys
let user_pk = Secp256k1Point::from_str(&user_public_instance_key)
    .map_err(|_| StdError::generic_err("Failed to decode user public key"))?;
state.public_instance_key = user_pk + chain_public_instance_key;
let k_chain_shares = scrt_sss::split(&mut rng, &k_chain, state.threshold, total_shares);
let a_chain_shares = scrt_sss::split(&mut rng, &a_chain, state.threshold, total_shares);
let chain_zero_shares1 = scrt_sss::split(
    &mut rng,
    &Secp256k1Scalar::zero( ),
    state.threshold * 2,
    total_shares,
);
let chain_zero_shares2 = scrt_sss::split(
    &mut rng,
    &Secp256k1Scalar::zero( ),
    state.threshold * 2,
    total_shares,
);
```

TABLE 2

```
// Chain has the last 't' shares. Compute over them
let mut k_chain_shares_final = vec![ ];
let mut a_chain_shares_final = vec ![ ];
let mut chain_zero_shares_final1 = vec![ ];
let mut chain_zero_shares_final2 = vec![ ];
for i in state.num_of_users..total_shares {
    k_chain_shares_final.push(
        k_user_shares.get((i) as usize).unwrap( ) + k_chain_shares.get(i as usize).unwrap( ),
    );
    a_chain_shares_final.push(
        a_user_shares.get((i) as usize).unwrap( ) + a_chain_shares.get(i as usize).unwrap( ),
    );
    chain_zero_shares_final1.push(
        user_zero_shares1.get((i) as usize).unwrap( )
            + chain_zero_shares1.get(i as usize).unwrap( ),
    );
    chain_zero_shares_final2.push(
        user_zero_shares2.get((i) as usize).unwrap( )
            + chain_zero_shares2.get(i as usize).unwrap( ),
    );
}
// Store all to state so everyone can retreive later..
state.k_user_shares = k_user_shares;
state.k_chain_shares = k_chain_shares;
state.k_chain_shares_final = k_chain_shares_final;
state.a_user_shares = a_user_shares;
state.a_chain_shares = a_chain_shares;
state.a_chain_shares_final = a_chain_shares_final;
state.user_zero_shares1 = user_zero_shares1;
state.chain_zero_shares1 = chain_zero_shares1;
state.chain_zero_shares_final1 = chain_zero_shares_final1;
state.user_zero_shares2 = user_zero_shares2;
state.chain_zero_shares2 = chain_zero_shares2;
state.chain_zero_shares_final2 = chain_zero_shares_final2;
#[cfg(test)]
{
    state.chain_private_instance_key = k_chain;
}
```

TABLE 2-continued

```
  save_state(deps.storage, state)?;
  Ok(Response::default( ))
}
```

Tables 3-4 show a nonlimiting code example for a signing or sign execution procedure according to some embodiments of the invention (where, e.g., a chain or blockchain party 'Pc' generates data points; receives and reconstructs data points, combines/validates signing, or consolidates a plurality of signature shares on chain, e.g., using a private component; and broadcasts data points or reconstructed keys to relevant entities).

TABLE 3

```
fn execute_sign(
  deps: DepsMut,
  _env: Env,
  _info: MessageInfo,
  _user_index: u32,
  user_sig_num_share: Share<Secp256k1Scalar>,
  user_sig_denom_share: Share<Secp256k1Scalar>,
  tx: EthTx,
) -> Result<Response, CustomContractError> {
  if tx.value.u128( ) > MAX_ALLOWANCE {
    return Err(CustomContractError::Std(StdError::generic_err(
      "cannot send more than max allowance of 1 ETH",
    )));
  }
  let mut state = load_state(deps.storage)?;
  let _total_shares = state.num_of_users + state.threshold;
  // Store user's shares
  state.sig_num_shares.push(user_sig_num_share);
  state.sig_denom_shares.push(user_sig_denom_share);
  if state.sig_num_shares.len( ) + (state.threshold as usize)
      < ((2 * state.threshold + 1) as usize)
  {
    // Not enough shares yet to produce a signature
    // println!("Not enough shares yet!");
    save_state(deps.storage, state)?;
    return Ok(Response::default( ));
  }
  if state.sig != Secp256k1Scalar::default( ) {
    // Already generated signature
    // println!("Already generated signature!");
    return Ok(Response::default( ));
  }
  // We have 2t+1 shares --> can produce a signature on-chain
  // println!("Running sign..");
  // TODO: not deterministic message..
  let tx: LegacyTransaction = tx.into( );
  let message_to_sign = tx.hash( );
  let m = Secp256k1Scalar::from_slice(&message_to_sign).unwrap( );
  let r = state.public_instance_key.x( );
  // Produce the t 'chain' shares
  for i in 0..= state.threshold - 1 {
    let sk_share = state.sk_chain_shares_final.get(i as usize).unwrap( ).clone( );
    let k_share = state.k_chain_shares_final.get(i as usize).unwrap( ).clone( );
    let a_share = state.a_chain_shares_final.get(i as usize).unwrap( ).clone( );
    let zero_share1 = state
      .chain_zero_shares_final1
      .get(i as usize)
      .unwrap( )
      .clone( );
    let zero_share2 = state
      .chain_zero_shares_final2
      .get(i as usize)
      .unwrap( )
      .clone( );
    let sig_num_share =
      a_share.clone( ) * (m.clone( ) + (r.clone( ) * sk_share.data)) - zero_share1.clone( );
    let sig_denom_share = k_share.clone( ) * a_share.clone( ).data - zero_share2.clone( );
    // println!("Shares ids are: {:?}, {:?}, {:?}", sk_share.id, sig_num_share.id,
  sig_denom_share.id);
    state.sig_num_shares.push(sig_num_share);
    state.sig_denom_shares.push(sig_denom_share);
  }
  let s1 = scrt_sss::open(state.sig_num_shares.clone( )).unwrap( );
  let s2 = scrt_sss::open(state.sig_denom_shares.clone( )).unwrap( );
  let mut s = s1 * s2.inv( );
```

TABLE 3-continued

```
if s.to_big_int( ) < Secp256k1Scalar::zero( ).to_big_int( ) {
    s = s.inv( )
}
println!(
    "state.public_instance_key aka nonce: 0x{ }",
    state.public_instance_key.clone( ).to_string( )
);
println!(
    "state.public_key: 0x{ }",
    state.public_key.clone( ).to_string( )
);
```

TABLE 4

```
// Calculate v
// Source: https://ethereum.stackexchange.com/a/118342/12112
#[allow(non_snake_case)]
let R = state.public_instance_key.clone( );
let recovery_id: u8 = if R.y( ).is_even( ) { 0 } else { 1 };
let v = recovery_id as u64 + 35 + tx.chain * 2;
let signed_tx = tx.sign(&EcdsaSig {
    v,
    r: r.to_raw( ).to_vec( ),
    s: s.to_raw( ).to_vec( ),
});
println!("r: 0x{ }", hex::encode(r.to_raw( )));
println!("s: 0x{ }", hex::encode(s.to_raw( )));
println!("v: { } (0x{ })", v, hex::encode((v as u8).to_be_bytes( )));
// check signature
let sig_for_verify = &Signature {
    r: r.value,
    s: s.value,
}
.serialize( );
let pk_for_verify =
    &PublicKey::parse_slice(&state.public_key.to_slice( ), Some(PublicKeyFormat::Raw))
        .unwrap( )
        .serialize_compressed( );
let is_verified = deps
    .api
    .secp256k1_verify(&message_to_sign, sig_for_verify, pk_for_verify)
    .unwrap( );
println!("*******************************");
if is_verified {
    println!("\x1b[32mgood signature\x1b[0m");
} else {
    println!("\x1b[31mBAD SIGNATURE\x1b[0m");
}
println!("*******************************");
println!("recovery_id: { }", recovery_id);
let recovered_pubkey = deps
    .api
    .secp256k1_recover_pubkey(&message_to_sign, sig_for_verify, recovery_id)
    .unwrap( );
println!(
    "recovered_pubkey: 0x{ }",
    hex::encode(recovered_pubkey.clone( ))
);
let is_pubkey_recovery =
    state.public_key.clone( ).to_string( ) == hex::encode(recovered_pubkey)[2..] &&
state.public_key.clone( ).to_string( ) ==
"4e87a2f102097fc6b53821db6e2cd3b774d9486ecae5e613f2643e24698fd6578e7c49c6bb0
b81950413d61d75a6cad12f5de0d66b6980f3c8e83b6b74095c0f";
println!("%%%%%%%%%%%%%%%%%%%%%%%%%%%%%%%");
if is_pubkey_recovery {
    println!("\x1b[32mgood pubkey recovery\x1b[0m");
} else {
    println!("\x1b[31mBAD PUBKEY RECOVERY\x1b[0m");
}
println!("%%%%%%%%%%%%%%%%%%%%%%%%%%%%%%%");
// TODO: we need to be able to store multiple signatures on-chain so other parties can read
them. This is temporary
state.sig = s.clone( );
save_state(deps.storage, state)?;
Ok(Response::default( ).set_data(Binary::from(signed_tx)))
}
```

Tables 5-6 show a multi entity procedure including simulation of entities and/or their behavior (which may be, e.g., adversarial behavior) on chain according to some embodiments of the invention (and including. e.g., on-chain execution: each entity creates the private key locally and sending it to the chain entity or 'Pc', each entity uses the public key broadcasted or advertised by the chain or 'Pc' to create its own share locally).

TABLE 5

```
fn execute_test( ) {
    let mut deps = mock_dependencies( );
    let num_of_shares = 6u8;
    let threshold = 4u8;
    let total_shares = num_of_shares + threshold;
    let info = instantiate_contract(deps.as_mut( ), num_of_shares, threshold);
    // Keygen
    //                                                                    privkey
0000000000000000000000000000000000000000000000000000000000000007
    // => address 0x4D8846d36D5349F14eC887a7701E48475453932A
    let (sk_user_shares, sk_user, pk_user) =
        client_create_share_from_privkey(total_shares,           threshold,
Secp256k1Scalar::from_num(7));
    let msg = ExecuteMsg::KeyGen {
        user_public_key: pk_user.to_string( ),
        user_secret_key_shares: sk_user_shares,
    };
    println!(
        "privkey: 0x{ }",
        hex::encode(Secp256k1Scalar::from_num(7).to_raw( ))
    );
    println!("sk_user: 0x{ }", hex::encode(sk_user.to_raw( )));
    println!("pk_user: 0x{ }", pk_user.to_string( ));
    let _ = execute(deps.as_mut( ), mock_env( ), info.clone( ), msg).unwrap( );
    // Get all values..
    let mut sk_shares = vec![ ];
    for i in 0..= num_of_shares − 1 {
        // read shares for each party
        let msg = QueryMsg::ReadKeyGen {
            user_index: i as u32,
        };
        let resp = query(deps.as_ref( ), mock_env( ), msg).unwrap( );
        let decoded_response: ReadKeyGenResponse = from_binary(&resp).unwrap( );
        let sk_share = decoded_response.sk_user_share + decoded_response.sk_chain_share;
        sk_shares.push(sk_share);
    }
```

TABLE 6

```
//// Presig
// Generate 4 values and their shares: k_user, a_user, 0, 0
let (k_user_shares, _k_user, k_user_public) = client_create_share(total_shares,
threshold);
let (a_user_shares, _a_user) = client_create_share_no_public(total_shares, threshold);
let user_zero_shares1 = client_create_share_no_secret(total_shares, threshold * 2);
let user_zero_shares2 = client_create_share_no_secret(total_shares, threshold * 2);
let msg = ExecuteMsg::CreatePresig {
    user_index: 0,
    k_user_shares,
    a_user_shares,
    user_zero_shares1,
    user_zero_shares2,
    public_instance_key: k_user_public.to_string( ),
};
let _= execute(deps.as_mut( ), mock_env( ), info.clone( ), msg).unwrap( );
//// Sign
let tx = EthTx {
    nonce: Uint128::new(3),
    gas_price: Uint128::new(13_000_000_000), // 13 Gwei
    gas::Uint128:new(21_000),
    to: Binary::from(
        H160::from_str("0x4D8846d36D5349F14eC887a7701E48475453932A")
            .expect("converting 'to' into bytes")
            .to_fixed_bytes( ),
    ),
    value: Uint128::new(0_000_000_000_000_000_001),
    data: vec![ ],
    chain: 1, // Mainnet
};
let message_to_sign = Into::<LegacyTransaction>::into(tx.clone( )).hash( );
let m = Secp256k1Scalar::from_slice(&message_to_sign).unwrap( );
for i in 0..= num_of_shares − 1 {
```

TABLE 6-continued

```
    // read shares for each party
    let query_msg = QueryMsg::ReadPresig {
       user_index: i as u32,
    };
    let resp = query(deps.as_ref( ), mock_env( ), query_msg).unwrap( );
    let decoded_response: ReadPresigResponse = from_binary(&resp).unwrap( );
    let k_share = decoded_response.k_user_share + decoded_response.k_chain_share;
    let a_share = decoded_response.a_user_share + decoded_response.a_chain_share;
    let zero_share1 =
       decoded_response.user_zero_share1 + decoded_response.chain_zero_share1;
    let zero_share2 =
       decoded_response.user_zero_share2 + decoded_response.chain_zero_share2;
    let pk_from_chain =
       Secp256k1Point::from_str(&decoded_response.public_instance_key).unwrap( );
    let r = pk_from_chain.x( );
    let sk_share = sk_shares.get(i as usize).unwrap( ).clone( );
    let sig_num_share =
       a_share.clone( ) * (m.clone( ) + (r * sk_share.data)) − zero_share1.clone( );
    let sig_denom_share = k_share.clone( ) * a_share.clone( ).data − zero_share2.clone( );
    // println!("Shares ids are: {:?}, {:?}, {:?}", sk_share.id, sig_num_share.id,
sig_denom_share.id);
    let exec_msg = ExecuteMsg::Sign {
       user_index: i as u32,
       user_sig_num_share: sig_num_share,
       user_sig_denom_share: sig_denom_share,
       tx: tx.clone( ),
    };
    let res = execute(deps.as_mut( ), mock_env( ), info.clone( ), exec_msg).unwrap( );
    if res.data.is_some( ) {
       println!("===============================================");
       println!(
          "signed eth tx: \x1b[33m0x{ }\x1b[0m",
          hex::encode(res.data.unwrap( ).0)
       );
       println!("===============================================");
    }
  }
}
```

Additional or alternative example protocols and procedures may be used in different embodiments of the invention.

While certain features of the invention have been illustrated and described herein, many modifications, substitutions, changes, and equivalents may occur to those skilled in the art. It is, therefore, to be understood that the appended claims are intended to cover all such modifications and changes fall within the true spirit of the invention.

Various embodiments have been presented. Each of these embodiments may of course include features from other embodiments presented, and embodiments not specifically described may include various features described herein.

The invention claimed is:

1. A computerized method of performing secure exchanges of data over a computer network, the method comprising, using one or more computer processors:
   generating, by a computerized blockchain entity, a plurality of data points of the computerized blockchain entity, wherein the generating of data points of the computerized blockchain entity is performed based on a data point from a first computerized signing entity of one or more computerized signing entities;
   reconstructing, by the computerized blockchain entity, one or more data points of one or more of the computerized signing entities, the data points of the computerized signing entities generated based on one or more of the data points of the computerized blockchain entity; and
   performing an exchange of data between one or more of: the computerized blockchain entity, and one or more of the computerized signing entities based on one or more of the reconstructed data points.

2. The computerized method of claim 1, comprising: broadcasting one or more of the reconstructed data points, the broadcasting using a public component of the computerized blockchain entity.

3. The computerized method of claim 1, comprising receiving the data point from the first computerized signing entity using a private component of the computerized blockchain entity, wherein the generating of data points of the computerized blockchain entity is performed using the private component.

4. The computerized method of claim 1, comprising:
   calculating, by one or more of the computerized signing entities, a plurality of public key shares based on a secret key share of the first computerized signing entity and a secret key share of the computerized blockchain entity; and
   resolving, by the computerized blockchain entity, one or more of the public key shares, wherein at least one of: the generating of data points of the computerized blockchain entity, the reconstructing of data points of the computerized signing entities, and the performing of an exchange of data are performed based on the resolved public key shares.

5. The computerized method of claim 1, comprising simulating, by the computerized blockchain entity, one or more computerized operations, the simulated operations associated with one or more of the data points of the computerized signing entities.

6. The computerized method of claim 1, wherein the computerized blockchain entity is implemented on a blockchain network.

7. The computerized method of claim 6, wherein the exchange of data comprises excluding the first computerized signing entity from the blockchain network.

8. The computerized method of claim 5, wherein the simulated operations comprise one or more pseudorandom values, and wherein the simulated operations describe an adversarial computerized behavior by one or more of the computerized signing entities.

9. The computerized method of claim 4, wherein the public key shares are generated using an elliptic curve algorithm.

10. The computerized method of claim 6, wherein the blockchain network comprises an Ethereum blockchain.

11. A computerized system for performing secure exchanges of data over a computer network, the system comprising:
a memory; and
one or more processors configured to:
generate, by a computerized blockchain entity, a plurality of data points of the computerized blockchain entity, wherein the generating of data points of the computerized blockchain entity is performed based on a data point from a first computerized signing entity of one or more computerized signing entities;
reconstruct, by the computerized blockchain entity, one or more data points of one or more of the computerized signing entities, the data points of the computerized signing entities generated based on one or more of the data points of the computerized blockchain entity; and
perform of an exchange of data between one or more of: the computerized blockchain entity, and one or more of the computerized signing entities based on one or more of the reconstructed data points.

12. The computerized system of claim 11, wherein one or more of the processors are to broadcast one or more of the reconstructed data points, the broadcasting using a public component of the computerized blockchain entity.

13. The computerized system of claim 11, wherein one or more of the processors are to receive the data point from the first computerized signing entity using a private component of the computerized blockchain entity, and wherein the generating of data points of the computerized blockchain entity is performed using the private component.

14. The computerized system of claim 11, wherein one or more of the processors are to:
calculate, by one or more of the computerized signing entities, a plurality of public key shares based on a secret key share of the first computerized signing entity and a secret key share of the computerized blockchain entity; and
resolve, by the computerized blockchain entity, one or more of the public key shares, wherein at least one of: the generating of data points of the computerized blockchain entity, the reconstructing of data points of the computerized signing entities, and the performing of an exchange of data are performed based on the resolved public key shares.

15. The computerized system of claim 11, wherein one or more of the processors are to simulate, by the computerized blockchain entity, one or more computerized operations, the simulated operations associated with one or more of the data points of the computerized signing entities.

16. The computerized system of claim 11, wherein the computerized blockchain entity is implemented on a blockchain network.

17. The computerized system of claim 16, wherein the exchange of data comprises excluding the first computerized signing entity from the blockchain network.

18. The computerized system of claim 15, wherein the simulated operations comprise one or more pseudorandom values, and wherein the simulated operations describe an adversarial computerized behavior by one or more of the computerized signing entities.

19. The computerized system of claim 14, wherein the public key shares are generated using an elliptic curve algorithm.

20. The computerized system of claim 16, wherein the blockchain network comprises an Ethereum blockchain.

* * * * *